United States Patent
van den Oord et al.

(10) Patent No.: US 11,080,591 B2
(45) Date of Patent: *Aug. 3, 2021

(54) PROCESSING SEQUENCES USING CONVOLUTIONAL NEURAL NETWORKS

(71) Applicant: DeepMind Technologies Limited, London (GB)

(72) Inventors: Aaron Gerard Antonius van den Oord, London (GB); Sander Etienne Lea Dieleman, London (GB); Nal Emmerich Kalchbrenner, London (GB); Karen Simonyan, London (GB); Oriol Vinyals, London (GB); Lasse Espeholt, London (GB)

(73) Assignee: DeepMind Technologies Limited, London (GB)

( * ) Notice: Subject to any disclaimer, the term of this patent is extended or adjusted under 35 U.S.C. 154(b) by 897 days.

This patent is subject to a terminal disclaimer.

(21) Appl. No.: 15/697,407

(22) Filed: Sep. 6, 2017

(65) Prior Publication Data

US 2018/0075343 A1    Mar. 15, 2018

Related U.S. Application Data

(60) Provisional application No. 62/384,115, filed on Sep. 6, 2016, provisional application No. 62/384,123, filed
(Continued)

(51) Int. Cl.
*G06N 3/04* (2006.01)
*G10L 15/16* (2006.01)
(Continued)

(52) U.S. Cl.
CPC ......... *G06N 3/0472* (2013.01); *G06F 40/279* (2020.01); *G06F 40/44* (2020.01);
(Continued)

(58) Field of Classification Search
CPC .. G06N 3/0472; G06N 3/0445; G06N 3/0454; G06N 3/084; G06F 40/279;
(Continued)

(56) References Cited

U.S. PATENT DOCUMENTS

| | | | |
|---|---|---|---|
| 5,377,302 A | 12/1994 | Tsiang | |
| 5,668,926 A | 9/1997 | Karaali et al. | |

(Continued)

FOREIGN PATENT DOCUMENTS

| | | | | |
|---|---|---|---|---|
| CA | 2810457 | | 9/2014 | |
| CA | 2810457 A1 | * | 9/2014 | ............. G10L 15/16 |

(Continued)

OTHER PUBLICATIONS

Hertel et al., "Comparing Time and Frequency Domain for Audio Event Recognition Using Deep Learning", Mar. 18, 2016, arXIV. org. pp. 1-5 (Year: 2016).*

(Continued)

*Primary Examiner* — Paulinho E Smith
(74) *Attorney, Agent, or Firm* — Fish & Richardson P.C.

(57) ABSTRACT

Methods, systems, and apparatus, including computer programs encoded on computer storage media, for processing sequences using convolutional neural networks. One of the methods includes, for each of the time steps: providing a current sequence of audio data as input to a convolutional subnetwork, wherein the current sequence comprises the respective audio sample at each time step that precedes the time step in the output sequence, and wherein the convolutional subnetwork is configured to process the current sequence of audio data to generate an alternative representation for the time step; and providing the alternative representation for the time step as input to an output layer, wherein the output layer is configured to: process the alternative representation to generate an output that defines (Continued)

a score distribution over a plurality of possible audio samples for the time step.

20 Claims, 12 Drawing Sheets

Related U.S. Application Data on Sep. 6, 2016, provisional application No. 62/413,366, filed on Oct. 26, 2016.

(51) Int. Cl.

| | |
|---|---|
| G10L 13/08 | (2013.01) |
| G10L 25/30 | (2013.01) |
| G10L 13/04 | (2013.01) |
| G06N 3/08 | (2006.01) |
| G06F 40/44 | (2020.01) |
| G06F 40/279 | (2020.01) |
| G06F 17/18 | (2006.01) |

(52) U.S. Cl.
CPC ......... *G06N 3/0445* (2013.01); *G06N 3/0454* (2013.01); *G06N 3/084* (2013.01); *G10L 13/04* (2013.01); *G10L 13/086* (2013.01); *G10L 15/16* (2013.01); *G10L 25/30* (2013.01); *G06F 17/18* (2013.01); *G10H 2250/311* (2013.01)

(58) Field of Classification Search
CPC ......... G06F 40/44; G06F 17/18; G10L 13/04; G10L 13/086; G10L 15/16; G10L 25/30
See application file for complete search history.

(56) References Cited

U.S. PATENT DOCUMENTS

| | | | |
|---|---|---|---|
| 7,409,340 B2 | 8/2008 | Holzapfel | |
| 8,527,276 B1 | 9/2013 | Senior | |
| 8,645,137 B2* | 2/2014 | Bellegarda | G10L 15/07 |
| | | | 704/250 |
| 9,058,811 B2 | 6/2015 | Wang | |
| 9,190,053 B2 | 11/2015 | Penn | |
| 9,734,824 B2 | 8/2017 | Penn | |
| 9,953,634 B1 | 4/2018 | Pearce | |
| 10,049,106 B2 | 8/2018 | Goyal et al. | |
| 10,304,477 B2* | 5/2019 | van den Oord | G06N 3/04 |
| 10,354,015 B2 | 7/2019 | Kalchbrenner et al. | |
| 10,460,747 B2* | 10/2019 | Roblek | G06F 11/0715 |
| 10,586,531 B2* | 3/2020 | van den Oord | G06N 3/0481 |
| 10,733,390 B2 | 8/2020 | Kalchbrenner et al. | |
| 10,803,884 B2* | 10/2020 | van den Oord | G10L 13/06 |
| 2002/0110248 A1* | 8/2002 | Kovales | G10L 13/00 |
| | | | 381/56 |
| 2006/0064177 A1 | 3/2006 | Tian et al. | |
| 2012/0166198 A1 | 6/2012 | Lin | |
| 2012/0323521 A1 | 12/2012 | De Foms et al. | |
| 2016/0023244 A1 | 1/2016 | Zhuang et al. | |
| 2016/0140951 A1 | 5/2016 | Agiomyrgiannakis | |
| 2016/0232440 A1* | 8/2016 | Gregor | G06N 3/04 |
| 2017/0011738 A1* | 1/2017 | Senior | G10L 15/063 |
| 2017/0103752 A1* | 4/2017 | Senior | G06N 3/0445 |
| 2017/0148431 A1* | 5/2017 | Catanzaro | G10L 15/02 |
| 2017/0262737 A1* | 9/2017 | Rabinovich | G06N 3/0454 |
| 2018/0025721 A1* | 1/2018 | Li | G06N 3/08 |
| | | | 704/232 |
| 2018/0075343 A1* | 3/2018 | van den Oord | G06N 3/0472 |
| 2018/0322891 A1* | 11/2018 | van den Oord | G10L 25/30 |
| 2018/0329897 A1 | 11/2018 | Kalchbrenner et al. | |
| 2018/0365554 A1 | 12/2018 | Van den Oord et al. | |
| 2019/0043516 A1 | 2/2019 | Germain et al. | |
| 2019/0066713 A1 | 2/2019 | Mesgarani et al. | |
| 2019/0108833 A1* | 4/2019 | van den Oord | G06N 3/0481 |
| 2019/0251987 A1* | 8/2019 | van den Oord | G10L 13/06 |
| 2019/0286708 A1 | 9/2019 | Kalchbrenner et al. | |
| 2020/0051583 A1* | 2/2020 | Wu | G10L 13/08 |
| 2020/0126539 A1* | 4/2020 | van den Oord | G10L 15/22 |
| 2020/0342183 A1 | 10/2020 | Kalchbrenner et al. | |

FOREIGN PATENT DOCUMENTS

| | | |
|---|---|---|
| CN | 105096939 A | 11/2015 |
| CN | 105321525 A | 2/2016 |
| CN | 105513591 A | 4/2016 |
| JP | H08512150 | 12/1996 |
| JP | H10333699 | 12/1998 |
| JP | 2002123280 | 4/2002 |

OTHER PUBLICATIONS

Kalchbrenneretal., "Neural Machine Translation in Linear Time", Oct. 31, 2016, ArXiv.org. pp. 1-9 (Year: 2016).*
Oord et al., "Wavenet: A Generative Model for Raw Audio", Sep. 12, 2016, arXiv.org, pp. 1-15 (Year: 2016).*
Written Opinion issued in International Application No. PCT/US2017/050320, dated Aug. 3, 2018, 7 pages.
Written Opinion issued in International Application No. PCT/US2017/050335, dated Aug. 3, 2018, 7 pages.
International Preliminary Report on Patentability issued in International Application No. PCT/US2017/050320, dated Dec. 14, 2018, 7 pages.
International Preliminary Report on Patentability issued in International Application No. PCT/US2017/050335, dated Dec. 14, 2018, 7 pages.
CA Office Action in Canadian Appln. No. 3,036,067, dated Apr. 14, 2020, 4 pages.
'www.itu.int' [online] "ITU-T Recommendation G 711, Pulse Code Modulation (PCM) of voice frequencies," Nov. 1988, [retrieved on Jul. 9, 2018] Retrieved from Internet: URL<https://www.itu.int/rec/T-REC-G.711-198811-I/en> 1 page.
Fant et al. "TTS synthesis with bidirectional LSTM based recurrent neural networks," Interspeech, Sep. 2014, 5 pages.
Tokuda. "Speech synthesis as a statistical machine learning problem," Invited talk given at ASRU, Dec. 2011, [retrieved on Jul. 9, 2018] Retrieved from Internet: URL<www.sp.nitech.ac.jpt/~tokuda/tokuda_asru2011_for_pdf.pdf> 66 pages.
PCT International Preliminary Report on Patentability in International Appln. No. PCT/US2017/058046, dated May 9, 2019, 9 pages.
EP Office Action in European Appln 17794596.1, dated Jun. 5, 2019, 3 pages.
CN Office Action in Chinese Appln. No. 201780065523.6, dated Jan. 6, 2020, 14 pages (with English translation).
'homepages.inf.ed.ac.uk' [online] "CSTR VCTK Corpus English Multi-Speaker Corpus for CSTR Voice Cloning Toolkit," Junichi Yamagishi, The Centre for Speech Technology Research, Available on or before Mar. 13, 2013, [retrieved on Dec. 26, 2017] Retrieved from Internet URL<http://homepages.inf.ed.ac.uk/jyamagis/page3/page58/page58.html> via the Wayback Machine at URL<https://web.archive.org/web/20130315110746/http://homepages.inf.ed.ac.uk/jyamagis/page3/page58/page58.html> 2 pages.
'www.sp.nitech.ac.jp' [online] "Speech Synthesis as a Statistical Machine Learning Problem," Presentation. Keiichi Tokuda, Nogoya Institute of Technology, ASRU Hawaii, Dec. 14, 2011, 66 slides.
Agiomyrgiannakis "Vocain the vocoder and applications is speech synthesis," IEEE International Conference on Acoustics, Speech and Signal Processing, Apr. 19, 2015, 5 pages.
Bandanau et al. "Neural machine translation by jointly learning to align and translation," arXiv 1409.0473v7, May 19, 2016, 15 pages.
Bishop. "Mixture density networks," Technical Report NCRG/94/004, Neural Computing Research Group, Aston University, 1994, 26 pages.
Chen et al. "Semantic image segmentation with deep convolutional nets and fully connected CRF' s," arXiv 1412.7062v4, Jun. 7, 2016, 14 pages.

(56) References Cited

OTHER PUBLICATIONS

Fan et al. "TTS synthesis with bidirectional LSTM based recurrent neural networks," Fifteenth Annual Conference of the International Speech Communication Association, 2014, 5 pages.
Gonzalvo et al. "Recent advances in Google real-time HMM-driven unit selection synthesizer," In Proc. Interspeech, Sep. 2016, 5 pages.
He et al. "Deep residual learning for image recognition," arXiv 1512.03385v1, Dec. 10, 2015, 12 pages.
Hochreiter et al. "Long short-term memory," Neural Computation 9(8), Nov. 1997, 46 pages.
Hoshen et al. "Speech acoustic modeling from raw multichannel waveforms," IEEE International Conference on Acoustics, Speech and Signal Processing, Apr. 19, 2015, 5 pages.
Hunt et al. "Unit selection in a concatenative speech synthesis system using a large speech database," IEEE International Conference on Acoustics, Speech and Signal Processing, May 7, 1996, 4 pages.
International Search Report and Written Opinion issued in International Application No. PCT/US2017/050335, dated Jan. 2, 2018, 16 pages.
International Search Report and Written Opinion issued in International Application No. PCT/US2017/050320, dated Jan. 2, 2018, 16 pages.
International Search Report and Written Opinion issued in International Application No. PCT/US2017/058046, dated Jan. 31, 2018, 15 pages.
Jozefowicz et al. "Exploring the limits of language modeling," arXiv 1602.02410v2 Feb. 11, 2016, 11 pages.
Kalchbrenner et al. "Video pixel networks," arXiv 1610.00527v1, Oct. 3, 2016, 16 pages.
Karaali "text-to-speech conversion with neural networks: A recurrent TDNN approach," cs.NE/9811032, Nov. 24, 1998, 4 pages.
Kawahara et al. "Aperiodicity extraction and control using mixed mode excitation and group delay manipulation for a high quality speech analysis, modification and synthesis system straight," Second International Workshop on Models and Analysis of Vocal Emissions for Biomedical Applications, Sep. 2001, 6 pages.
Kawahara et al. "Restructuring speech representations using a pitch-adaptive time-frequency smoothing and an instantaneous-frequency-based f0 extraction: possible role of a repetitive structure in sounds," Speech Comm. 27(3), Sep. 1999, 17 pages.
Lamb et al. "Convolutional encoders for neural machine translation," Project reports of 2015 CS224d course at Stanford university, Jun. 22, 2015, 8 pages.
Law et al. "Input-agreement: a new mechanism for collecting data using human computation games," Proceedings of the SIGCHI Conference on Human Factors in Computing Systems, ACM, Apr. 4, 2009, 10 pages.
Lee et al. "Fully character-level neural machine translation without explicit segmentation," arXiv 1610.03017v1, Oct. 10, 2016, 14 pages.
Maia et al. "Statistical parametric speech synthesis with joint estimation of acoustic and excitation model parameters," ISCA SSW7, Sep. 24, 2010, 6 pages.
Meng et al. "Encoding source Language with convolutional neural network for machine translation," Proceedings of the 53rd annual meeting of the Association for Computational Linguistics and the 7th International Joint Conference on Natural Language Processing, vol. 1, Jul. 26, 2015, 11 pages.
Morise et al. "WORLD: A vocoder-based high-quality speech synthesis system for real-time applications," IEICE Tranc. Inf. Syst., E99-D(7), Jul. 1, 2016, 8 pages.
Moulines et al. "Pitch synchronous waveform processing techniques for text-to-speech synthesis using diphones," Speech Comm. (9), Dec. 1990, 15 pages.
Muthukumar et al. "A deep learning approach to data-driven parameterizations for statistical parametric speech synthesis," arXiv 1409.8558v1, Sep. 30, 2014, 5 pages.

Nair et al. "Rectified linear units improve restricted Boltzmann machines," Proceedings of the 37th International Conference on Machine Learning, Jun. 21-24, 2010, 8 pages.
Nakamura et al. "Integration of spectral feature extraction and modeling for HMM-based speech synthesis," IEICE Transaction on Information and Systems 97(6), Jun. 2014, 11 pages.
Palaz et al. "Estimating phoneme class conditional probabilities from raw speech signal using convolutional neural networks," arXiv 1304.1018v2, Jun. 12, 2013, 5 pages.
Peltonen et al. "Nonlinear filter design: methodologies and challenges," ISPA Proceedings of the 2nd International Symposium on Image Signal Processing and Analysis, Jun. 2001, 6 pages.
Sagisaka et al. "ATR v-talk speech synthesis system," Second International Conference on Spoken Language Processing, Oct. 1992, 4 pages.
Sainath et al. "Learning the speech front-end with raw waveform CLDNNs," Sixteenth Annual Conference of the International Speech Communication Association, Sep. 2015, 5 pages.
Takaki et al. "A deep auto-encoder based low dimensional feature extraction from FFT spectral envelopes for statistical parametric speech synthesis," IEEE International Conference on Acoustics Speech and Signal Processing, Mar. 20, 2016, 6 pages.
Theis et al. "Generative image modeling using spatial LSTMs," Advances in Neural Information Processing Systems, Dec. 2015, 9 pages.
Toda et al. "A speech parameter generation algorithm generation algorithm considering global variance for HMM-based speech synthesis," IEICE Trans. Int Syst. 90(5), May 1, 2007, 9 pages.
Toda et al. "Statistical approach to vocal tract transfer function estimation based on factor analyzed trajectory hmm." IEEE International Conference on Acoustics, Speech and Signal Processing, Mar. 31, 2008, 4 pages.
Tokuda et al. "Directly modeling speech waveforms by neural networks for statistical parametric speech synthesis," IEEE International Conference on Acoustics, Speech and Signal Processing, Apr. 19, 2015, 5 pages.
Tokuda et al. "Directly modeling voiced and unvoiced components in speech waveforms by neural networks," IEEE International Conference on Acoustics, Speech and Signal Processing, Mar. 20, 2016, 5 pages.
Tuerk et al. "Speech synthesis using artificial neural networks trained on cepstral coefficients," in Proc. Eurospeech, Sep. 1993, 4 pages.
Tuske et al. "Acoustic modeling with deep neural networks using raw time signal for LVCSR," Fifteenth Annual Conference of the International Speech Communication Association, Sep. 2014, 5 pages.
Una et al. "Modeling acoustic feature dependencies with artificial neural networks: Trajectory-RNADE," Proceedings of the International Conference on Acoustics Speech and Signal Processing, Apr. 19, 2015, 5 pages.
Van den Oord et al. "Conditional image generation with pixelcnn decoders," arXiv 1606.05328v2, Jun. 18, 2016, 13 pages.
Van den Oord et al. "Pixel recurrent neural networks," arXiv 1601.06759v3, Aug. 19, 2016, 11 pages.
Van den Oord et al. "WaveNet: A Generative Model for Raw Audio," arXiv 1609.03499v2, Sep. 19, 2016, 15 pages.
Wu et al. "Minimum generation error training with direct log spectral distortion on LSPs for HMM-based speech synthesis," Interspeech, Sep. 2008, 4 pages.
Yoshimura. "Simultaneous modeling of phonetic and prosodic parameters and characteristic conversion for HMM-based text-to-speech systems," PhD thesis, Nagoya Institute of Technology, Jan. 2002, 109 pages.
Yu et al. "Multi-scale context aggregation by dilated convolutions," arXiv 1511.07122, Nov. Apr. 30, 2016, 13 pages.
Zen et al. "Fast, Compact, and high quality Lstm-Rnn based statistical parametric speech synthesizers for mobile devices," arXiv 1606.06061v2, Jun. 22, 2016, 14 pages.
Zen et al. "Statistical parametric speech synthesis using deep neural networks," IEEE International Conference on Acoustics, Speech and Signal Processing, May 26, 2013, 5 pages.

(56) References Cited

OTHER PUBLICATIONS

Zen et al. "Statistical parametric speech synthesis," Speech Comm. 51(11) Nov. 30, 2009, 24 pages.

Zen, Heiga. An example of context-dependent label format for HMM-based speech synthesis in English, The HTS CMUARCTIC demo 133, Mar. 2, 2006, 1 page.

In Office Action in Indian Appin. No. 201927011194, dated Mar. 10, 2021, 7 pp. (with English translation).

Jp Office Action in Japanese Appin. No. 2019-150456, dated Nov. 30, 2020, 4 pp. (with English translation).

EP Extended Search Report in European Appn. No. 20195353.6, dated Apr. 21, 2021, 7 pages.

JP Decision to Grant a Patent in Japanese Appln. No. 2019-150456, dated Apr. 26, 2021, 4 pages (with English translation).

Fisher et al., "WaveMedic: Convolutional Neural Networks for Speech Audio Enhancement," Stanford University, Sep. 2020, 6 pages.

\* cited by examiner

PROCESSING SEQUENCES USING CONVOLUTIONAL NEURAL NETWORKS

CROSS-REFERENCE TO RELATED APPLICATIONS

This application claims priority to U.S. Provisional Application No. 62/384,115, filed on Sep. 6, 2016; U.S. Provisional Application No. 62/384,123, filed on Sep. 6, 2016; and U.S. Provisional Application No. 62/413,366, filed on Oct. 26, 2016 The disclosures of the prior applications are considered part of and are incorporated by reference in the disclosure of this application.

BACKGROUND

This specification relates to processing and generating sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

Some of the aspects of this specification describe how a system implemented as computer programs on one or more computers in one or more locations can generate a sequence of audio data that includes a respective audio sample at each of multiple time steps. For example, the sequence of audio data can represent speech in a particular natural language or a piece of music.

In one innovative aspect of these aspects a neural network system implemented by one or more computers is configured to generate an output sequence of audio data that comprises a respective audio sample at each of a plurality of time steps. The neural network system may comprise a convolutional subnetwork comprising one or more audio-processing convolutional neural network layers; and an output layer. The convolutional subnetwork may be configured to, for each of the plurality of time steps: receive a current sequence of audio data that comprises the respective audio sample at each time step that precedes the (current) time step in the output sequence. The convolutional subnetwork may further be configured to process the current sequence of audio data to generate an alternative representation for the time (current) step. This alternative representation may thus comprise a numeric representation, i.e., an ordered collection of numeric values, in which the current sequence of audio data has been encoded by the convolutional subnetwork, for example encoding features of the current sequence. The output layer may be configured to, for each of the plurality of time steps: receive the alternative representation for the time step, and process the alternative representation for the time step to generate an output that defines a score distribution over a plurality of possible audio samples for the time step.

Some of the many advantages of such a system are described later. The system can use the score distribution to select a sample for the current time step, by sampling from the distribution. The output may, but need not necessarily, comprise one score for each possible audio sample value, for example 256 scores for 256 possible values. In can thus be useful to compress or compand the audio sample values, which may be amplitude values, to reduce the number of model outputs.

In some implementations the convolutional neural network layers are causal convolutional neural network layers, as described in more detail later. In particular, the audio-processing convolutional neural network layers may include one or more dilated causal convolutional neural network layers. Again as described in more detail later, a dilated convolutional neural network layer applies a convolution to non-adjacent values in a sequence, i.e., as defined by the outputs from a previous layer. This can increase the receptive field of the convolutional subnetwork by orders of magnitude whilst preserving the input (time) resolution and maintaining computational efficiency.

In some implementations the convolutional neural network layers include multiple stacked blocks of dilated convolutional neural network layers. Each block may comprise multiple dilated convolutional neural network layers with increasing dilation. For example the dilation may be increased by a factor n for each successive layer up to a limit within each block. This can further increase the receptive field size.

In some implementations one or more of the convolutional neural network layers may have gated activation units. For example a rectified linear or other unit following a convolution implemented by a layer may be replaced by a gated activation unit. In a gated activation unit the output may be a combination of two (causal) convolutions, a main convolution and a gate convolution. The convolutions may each be applied to some or all of the same outputs from the previous layer. The combination may involve a non-linear activation function applied to the gate convolution, for example an activation with a (0,1) range such as a sigmoid. This may then multiply a value from the main convolution; a non-linear activation function may, but need not be, applied to the main convolution. Such an approach may assist in capturing more complex structure within the data.

The alternative representation from the convolutional subnetwork at each time step may be conditioned on a neural network input, for example a latent representation of a conditioning input. The conditioning input may be global (substantially time-independent) and/or local (time-dependent). The conditioning input may comprise, for example, text, image or video data, or audio data, for example an example of a particular speaker or language or music. The neural network input may comprise an embedding of the conditioning input. For example in a text-to-speech system a global conditioning input may comprise a speaker embedding and a local conditioning input may comprise linguistic features. The system may be configured to map the neural network input, or a conditioning input, from a lower sampling frequency to the audio sample generation frequency, for example by repeating the input or upsampling the input using a neural network. Thus the neural network input may comprise features of a text segment and the output sequence may represent a verbalization of the text segment; and/or the neural network input may comprise speaker or intonation pattern values; and/or the neural network input may include one or more of: speaker identity information, language identity information, and speaking style information. Alternatively the output sequence represents a piece of music.

The convolutional subnetwork may comprise residual connections, for example a connection from an input of a convolutional layer to a summer to sum this with an intermediate output of the layer. This effectively allows the network to be trained to skip or partially skip a layer, thus speeding up convergence and facilitating training of deeper models. The convolutional subnetwork may additionally or alternatively comprise skip connections, for example directly from each of one or more intermediate layers of the convolutional subnetwork to one or more operations that directly generate the alternative representation that is provided to the output layer.

In some implementations processing the current sequence of audio data using the convolutional subnetwork, to generate an alternative representation for the time step, re-uses values computed for previous time steps. The re-used values may comprise values derived from application of a convolutional filter to the audio sample data or data derived therefrom. The re-used values may be stored at one time step and retrieved at a later time step when the same filter is applied to the same (or some of the same) audio sample data or data derived therefrom. This can make the system computationally more efficient and hence faster, because there is no need to re-compute the stored values.

Particular embodiments of these aspects of the subject matter described in this specification can be implemented so as to realize one or more of the following advantages. The neural network system can generate on the order of tens of thousands of audio samples per second, providing a greater level of granularity than other neural network-based audio generation systems. The neural network system can achieve results that significantly outperform the state of the art on audio generation tasks, e.g., by generating speech from text that is of higher quality than state of the art techniques. A single trained neural network system can be used to generate different voices by conditioning on the speaker identity. By using convolutional neural network layers, e.g., causal convolutional layers, instead of recurrent neural network layers, e.g., instead of long short-term memory (LSTM) layers, the neural network system can achieve these advantageous results while not needing as many computational resources to train as other systems that do include recurrent neural network layers, resulting in a reduced training time. By employing convolutional layers rather than recurrent layers, the computation of the neural network system can be more easily batched and more easily parallelized, e.g., because the layers of the network do not have to be unrolled for each time step, allowing the computation of the system to be performed more efficiently. Additionally, by employing dilated causal convolutional layers, the receptive field of the convolutional subnetwork and, therefore, the quality of the audio generated by the system, can be improved without greatly increasing the computational cost of generating the audio.

Other aspects of this specification describe how a system implemented as computer programs on one or more computers in one or more locations can generate a neural network output by processing a sequence including multiple inputs.

In one innovative aspect of these aspects a neural network system implemented by one or more computers is configured to receive an input sequence comprising a plurality of inputs and to generate a neural network output from the input sequence. The neural network system may comprise a convolutional subnetwork comprising a plurality of dilated convolutional neural network layers and an output subnetwork. The convolutional subnetwork may be configured to, for each of the plurality of inputs: receive a current input sequence comprising the input and the inputs that precede the input in the input sequence, and process the current input sequence to generate an alternative representation for the input. This alternative representation may thus comprise a numeric representation, i.e., an ordered collection of numeric values, in which the current input sequence has been encoded by the convolutional subnetwork, for example encoding features of the current sequence. The output subnetwork may be configured to receive the alternative representations of the inputs and to process the alternative representations to generate the neural network output.

Some of the many advantages of such a system are described later.

The neural network output can comprise a plurality of sets of scores with each set of scores including a respective score for each of a plurality of possible outputs. The system can to select outputs in accordance with the sets of scores to generate the output sequence comprising a plurality of outputs.

In some implementations the convolutional neural network layers are dilated causal convolutional neural network layers, as described in more detail later. Again as described in more detail later, a dilated convolutional neural network layer applies a convolution to non-adjacent values in a sequence, i.e., as defined by the outputs from a previous layer. This can increase the receptive field of the convolutional subnetwork by orders of magnitude whilst preserving the input (time) resolution and maintaining computational efficiency.

In some implementations the convolutional neural network layers include multiple stacked blocks of dilated convolutional neural network layers. Each block may comprise multiple dilated convolutional neural network layers with increasing dilation. For example the dilation may be increased by a factor n for each successive layer up to a limit within each block. This can further increase the receptive field size.

In some implementations one or more of the convolutional neural network layers may have gated activation units. For example a rectified linear or other unit following a convolution implemented by a layer may be replaced by a gated activation unit. In a gated activation unit the output may be a combination of two (causal) convolutions, a main convolution and a gate convolution. The convolutions may each be applied to some or all of the same outputs from the previous layer. The combination may involve a non-linear activation function applied to the gate convolution, for example an activation with a (0,1) range such as a sigmoid. This may then multiply a value from the main convolution; a non-linear activation function may, but need not be, applied to the main convolution. Such an approach may assist in capturing more complex structure within the data.

The convolutional subnetwork may comprise residual connections, for example a connection from an input of a convolutional layer to a summer to sum this with an intermediate output of the layer. This effectively allows the network to be trained to skip or partially skip a layer, thus speeding up convergence and facilitating training of deeper models. The convolutional subnetwork may additionally or alternatively comprise skip connections, for example directly from each of one or more intermediate layers of the convolutional subnetwork to one or more operations that directly generate the alternative representation that is provided to the output layer.

In some implementations, e.g., implementations where the system is used for speech recognition, the output subnetwork comprises: a mean pooling layer configured to: receive a subset of the alternative representations, and perform mean pooling on the subset of alternative representations to generate a mean pooled representation for the subset; and one or more additional neural network layers configured to, for each subset of the alternative representations, receive the mean pooled representation for the subset and to generate a set of scores for a position in the output sequence corresponding to the subset.

In some implementations processing the current sequence using the convolutional subnetwork, to generate an alternative representation for an input, re-uses values computed for previous time steps. The re-used values may comprise values derived from application of a convolutional filter to the input data or data derived therefrom. The re-used values may be stored at one time step and retrieved at a later time step when the same filter is applied to the same (or some of the same) audio sample data or data derived therefrom. This can make the system computationally more efficient and hence faster, because there is no need to re-compute the stored values.

Particular embodiments of these aspects of the subject matter described in this specification can be implemented so as to realize one or more of the following advantages. The neural network system as described in this specification can achieve results that outperform the state of the art on a variety of sequence processing tasks, e.g., speech recognition. By using convolutional neural network layers, e.g., dilated convolutional layers, instead of recurrent neural network layers, the neural network system can achieve these results while not needing as many computational resources to train as other systems that do include recurrent neural network layers, resulting in a reduced training time. By using convolutional neural network layers, e.g., causal convolutional layers, instead of recurrent neural network layers, e.g., instead of long short-term memory (LSTM) layers, the neural network system can achieve these advantageous results while not needing as many computational resources to train as other systems that do include recurrent neural network layers, resulting in a reduced training time. By employing convolutional layers rather than recurrent layers, the computation of the neural network system can be more easily batched and more easily parallelized, e.g., because the layers of the network do not have to be unrolled for each time step, allowing the computation of the system to be performed more efficiently. Additionally, by employing dilated causal convolutional layers, the receptive field of the convolutional subnetwork and, therefore, the quality of the output sequences generated by the system, can be improved without greatly increasing the computational cost of generating the output sequence. Moreover, the paths traversed by forwards and backward signals in the system between inputs and outputs are independent of the sequence distance between the inputs and outputs, which allows better signal propagation and long-range dependency learning, thereby improving output quality.

Other aspects of this specification describe a system implemented as computer programs on one or more computers in one or more locations that performs sequence transduction tasks, e.g., translates text from a source language to a target language, using neural networks.

According to a first aspect of these aspects there is provided a neural machine translation system for processing text sequences. The system is configured to receive an input sequence of source embeddings representing a source sequence of words in a source natural language and to generate an output sequence of target embeddings representing a target sequence of words that is a translation of the source sequence into a target natural language, the system comprising: a dilated convolutional neural network configured to process the input sequence of source embeddings to generate an encoded representation of the source sequence; and a masked dilated convolutional neural network configured to process the encoded representation of the source sequence to generate the output sequence of target embeddings.

In some implementations, the masked dilated convolutional neural network of the system is configured to generate the output sequence using dynamic unfolding.

In some implementations, the encoded representation is a matrix that includes a respective column of data for each source embedding, and wherein, at each time step in the output sequence, the masked dilated convolutional network is configured to take as input the corresponding column of the encoded representation and to generate a target embedding.

In some implementations, for each time step that does not have a corresponding column in the encoded representation, the system is configured to add a new column to the encoded representation that corresponds to the time step and set values in the column to zero.

In some implementations, at each time step, the masked dilated convolutional neural network is conditioned on the encoded representation and the target embeddings at time steps before the time step.

In some implementations, the dilated convolutional neural network is configured to preserve a resolution of representations of the source embeddings throughout the dilated convolutional neural network.

In some implementations, the masked dilated convolutional neural network comprises a plurality of one-dimensional masked dilated convolutional neural network layers.

In some implementations, a particular one-dimensional masked dilated convolutional neural network layer is followed by a sub-batch normalization layer, wherein the sub-batch normalization layer is configured to, during training of the neural machine translation system on a batch of training sequences: determine batch normalization statistics of outputs generated by the particular one-dimensional masked dilated convolutional neural network layer for training sequences in an auxiliary sub-batch of the batch of training sequences; and normalize, using the batch normalization statistics, outputs generated by the particular one-dimensional masked dilated convolutional neural network layer for training sequences in a main sub-batch of the batch of training sequences that is different from the auxiliary sub-batch.

In some implementations, one or more of the one-dimensional masked dilated convolutional neural network layers are wrapped in a residual block that contains one or more additional convolutional layers.

In some implementations, the residual block includes a rectified linear unit (ReLU) activation layer.

In some implementations, the residual block includes a multiplicative unit activation layer.

In some implementations, the plurality of one-dimensional masked dilated convolutional neural network layers are grouped into a plurality of groups, and wherein, within each group, the dilation rates of one-dimensional masked dilated convolutional neural network layers in the group are doubled every layer.

In some implementations, each source embedding is a respective bag of n-grams embedding, and wherein, for a given character in the source sequence, the bag of n-grams embedding for the character is a combination of n-gram embeddings of adjacent tokens to the given character in the source sequence.

In some implementations, the bag of n-grams embedding of the given character is a sum of the n-gram embeddings of adjacent n-grams to the given character for n ranging from one to k, wherein k is a predetermined positive integer that is greater than or equal to two.

In some implementations, the system further comprises an input subsystem configured to: receive the source sequence; and generate a sequence of bag of n-grams embeddings from the source sequence.

In some implementations, the dilated convolutional neural network comprises a plurality of one-dimensional dilated convolutional neural network layers that are not masked.

According to a second aspect, there is provided one or more computer storage media encoded with instructions that, when executed by one or more computers, cause the one or more computers to implement the system.

According to a third aspect, there is provided a method comprising: obtaining an input sequence of source embeddings representing a source sequence of words in a source natural language; and processing the input sequence using the system to generate an output sequence of target embeddings representing a target sequence of words that is a translation of the source sequence into a target natural language.

Particular embodiments of these aspects of the subject matter described in this specification can be implemented so as to realize one or more of the following advantages. A neural machine translation system as described in this specification can generate a translation such that the computation time of the system is minimized, i.e., such that the computation time is linear in the lengths of the source and target strings. The neural machine translation system processes inputs such that the resolution of the representation computed by the system stays the maximum possible throughout the computation, improving translation quality. By employing convolutional encoder and decoders, the neural machine translation system can generate translations that have a quality that matches or exceeds the state of the art, while having learning and inference times that are less than those of state of the art systems. For example, as compared to recurrent neural network, e.g., long short-term memory (LSTM), based architectures, the convolutional encoder and decoder do not need to be rolled out for each time step, decreasing the computational footprint required for training and inference. By using bag of n-gram embeddings, the neural machine translation system retains an open vocabulary and is able to predict rare words, proper names, numerical digits, and so on. Moreover, the paths traversed by forwards and backward signals in the neural machine translation system between inputs and outputs are independent of the sequence distance between the inputs and outputs, which allows better signal propagation and long-range dependency learning, thereby improving translation quality.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
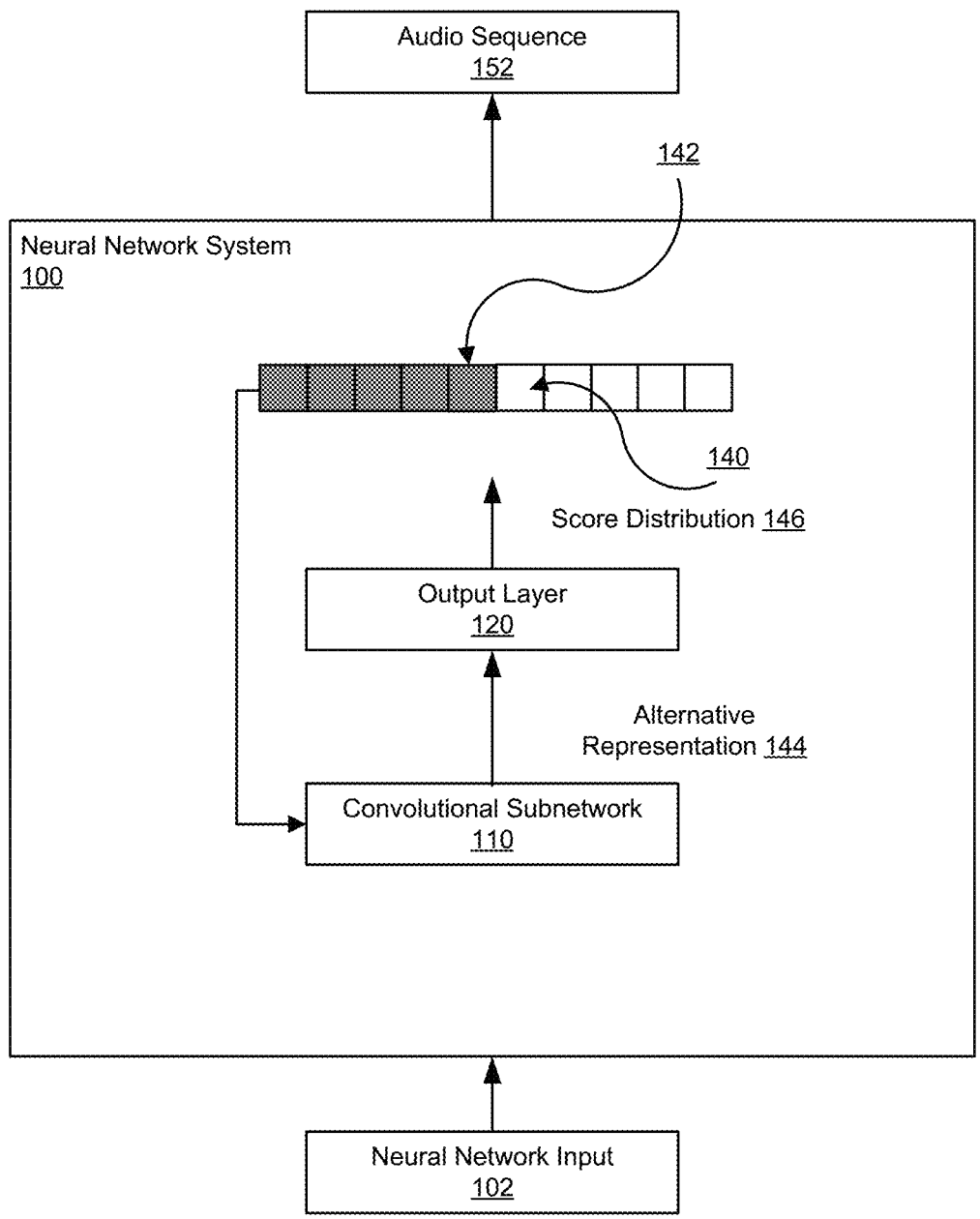
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 generates sequences of audio data that each include a respective audio sample at each of multiple time steps, e.g., an output sequence of audio data 152.

Generally, each time step in a given audio sequence corresponds to a respective time in an audio waveform and the audio sample at the time step characterizes the waveform at the corresponding time. In some implementations, the audio sample at each time step in the sequence is the amplitude of the audio waveform at the corresponding time, i.e., the sequence generated by the neural network system 100 is a raw audio waveform. In some other implementations, the audio sample at each time step in the sequence is a compressed or companded representation of the waveform at the corresponding time. For example, the audio sample can be a µ-law transformed representation of the waveform.

More specifically, the neural network system 100 generates audio sequences autoregressively. That is, for each particular time step in an output audio sequence, the neural network system 100 generates the audio sample at the time step conditioned on the audio samples that have already been generated as of the particular time step, i.e., on audio samples at time steps that are earlier than the particular time step in the audio sequence.

The neural network system 100 includes a convolutional subnetwork 110 and an output layer 120.

At each time step during the generation of an audio sequence, the convolutional subnetwork 110 is configured to receive the current audio sequence, i.e., the audio sequence that has already been generated as of the time step, and to process the current audio sequence to generate an alternative representation for the time step. For example, when generating an audio sample 140 in the audio sequence 152, the convolutional subnetwork 110 can receive a current audio sequence 142 that includes the audio samples that precede the audio sample 140 in the audio sequence 152 and process the current audio sequence 142 to generate an alternative representation 144.

The output layer 120 is configured to, at each of the time steps, receive the alternative representation at the time step and generate a score distribution over possible audio samples for the time step. The score distribution includes a respective score for each of multiple possible audio samples. In some implementations, the output layer 120 is a softmax output layer. For example, the output layer 120 can receive the alternative representation 144 and process the alternative representation 144 to generate a score distribution 146.

In particular, when the neural network system 100 is configured to generate raw audio data, the score distribution includes a respective score for each of multiple possible amplitude values. When the neural network system 100 is configured to generate compressed or companded values, the score distribution includes a respective score for each of multiple possible compressed or companded values.

Once the output layer 146 has generated the score distribution for a given time step, the neural network system 100 can select an audio sample to be included in the output sequence at the given time step from the multiple possible audio samples in accordance with the score distribution for the given time step. For example, the neural network system 100 can select an audio sample by sampling from the score distribution, i.e., sampling from the possible audio samples in accordance with the scores in the score distribution so that each audio sample is selected with a likelihood that corresponds to the score for the audio sample, or can select the possible audio sample having the highest score according to the score distribution.

The convolutional subnetwork 110 generally includes multiple audio-processing convolutional neural network layers. More specifically, the audio-processing convolutional neural network layers include multiple causal convolutional layers.

A causal convolutional layer is a convolutional layer that operates on an input sequence that has a respective input at each of multiple time steps by, for each time step, generating an output that depends only on the inputs at the time step and at the time steps before the time step in the input sequence, i.e., and not on any inputs at any time steps after the time step in the input sequence. In some cases, the causal convolutional layers are implemented by applying a normal convolution and then shifting each output of the normal convolution by a few time steps, i.e., shifting each output forward by (filter length−1) time steps, prior to applying the activation function for the convolutional layer, where "filter length" is the length of the filter of the convolution that is being applied.

To increase the receptive field of the audio-processing convolutional layers without requiring an excessive number of layers or filters of excessive length, some or all of the audio-processing convolutional layers can be dilated causal convolutional layers. A dilated convolution is a convolution where the filter is applied over an area larger than its length by skipping input values with a certain step that is defined by the dilation value for the dilated convolution. By incorporating dilated causal convolutions, the audio-processing neural network layers effectively operate on their inputs with a coarser scale than with a normal convolution.

In some implementations, the audio-processing neural network layers include a stack of multiple blocks of dilated causal convolutional layers. Each block in the stack can include multiple dilated convolutional neural network layers with increasing dilation. For example, within a block, the dilation can double for each layer starting from an initial dilation, and then return to the initial dilation for the first layer in the next block. As an illustrative example, the dilations of the dilated convolutional layers in a block can be, in order: 1, 2, 4, . . . , 512. A simplified example of a block of dilated causal convolutional layers is described below with reference to FIG. 2.

In some implementations, the convolutional subnetwork includes residual connections, skip connections, or both. An example architecture of the convolutional subnetwork that includes both residual connections and skip connections is described below with reference to FIG. 3.

In some implementations, the neural network system 100 generates audio sequences conditioned on a neural network input. For example, the neural network system 100 can generate the audio sequence 152 conditioned on a neural network input 102.

In some cases, the neural network input includes one or more local features, i.e., one or more features that are different for different time steps in the output sequence. For example, the neural network system 100 can obtain as input linguistic features of a text segment and can generate an audio sequence that represents a verbalization of the text segment, i.e., the neural network system 100 can function as part of a text-to-speech system that converts written text to spoken speech and also includes a component that verbalizes the audio sequence generated by the neural network system 100.

In some other cases, the neural network input includes one or more global features, i.e., one or more features that are the same throughout the entire output sequence. As an example, the neural network system 100 can generate speech conditioned on an identity of the speaker, i.e., so that the speech is generated to sound like the voice of the speaker. In this example, the neural network system 100 can obtain a vector encoding the identity of the speaker, e.g., a one-hot encoded vector identifying the speaker, and condition the generated speech on the obtained vector.

Generally, the audio sequences are conditioned on the neural network input by conditioning the activation function of some or all of the convolutional layers in the convolutional subnetwork. That is, the output of the activation function and, accordingly, the output of the convolutional layer, is dependent not only on the output of the convolution performed by the layer but also on the neural network input.

Conditioning an activation function of a convolutional layer on the neural network input will be described in more detail below with reference to FIG. 3.

Figure 2:
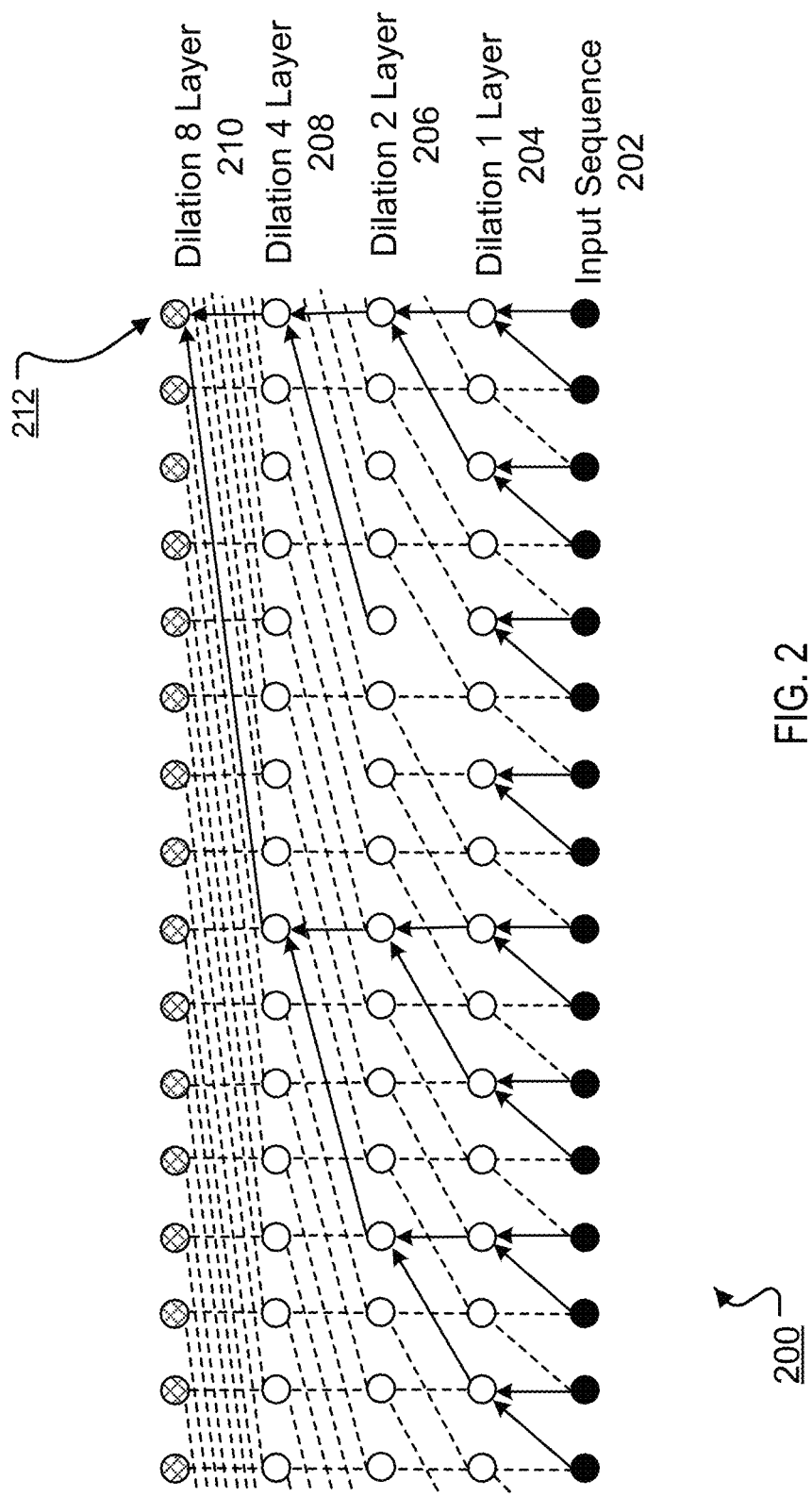
FIG. 2 shows a visualization of an example block of dilated causal convolutional layers.

FIG. 2 shows a visualization 200 of an example block of dilated causal convolutional layers. In particular, the example block includes a dilated causal convolutional layer 204 with dilation one, a dilated causal convolutional layer 206 with dilation two, a dilated causal convolutional layer 208 with dilation four, and a dilated causal convolutional layer 210 with dilation eight.

In the visualization 200, the block of dilated causal convolutional layers are operating on a current input sequence 202 to generate an output sequence. In particular, the visualization 200 visualizes using bold arrows how the block generates the output 212 that is the output at the time step that is currently the last time step in the current input sequence 202 and the output sequence.

As can be seen from the visualization 200, because each layer in the block is a causal convolutional layer, the output 212 depends only on outputs that are at the last current time step or time steps before the last current time step in the various sequences operated on by the layers in the block.

Additionally, as can be seen from the visualization 200, the layers in the block are arranged in order of increasing dilation, with the first layer in the block, i.e., dilated causal convolutional layer 204, having dilation one and the last layer in the block, i.e., dilated causal convolutional layer 204, having dilation eight. In particular, as is shown by the bold arrows in the visualization 200, because the dilated causal convolutional layer 204 has dilation one, the filter of the layer 204 is applied to adjacent inputs in the current input sequence 202. Because the dilated causal convolutional layer 206 has dilation two, the filter of the layer 206 is applied to outputs that are separated by one output in the output sequence generated by the layer 204. Because the dilated causal convolutional layer 208 has dilation four, the filter of the layer 208 is applied to outputs that are separated by three outputs in the output sequence generated by the layer 206. Because the dilated causal convolutional layer 210 has dilation eight, the filter of the layer 210 is applied to outputs that are separated by seven outputs in the output sequence generated by the layer 208.

Figure 3:
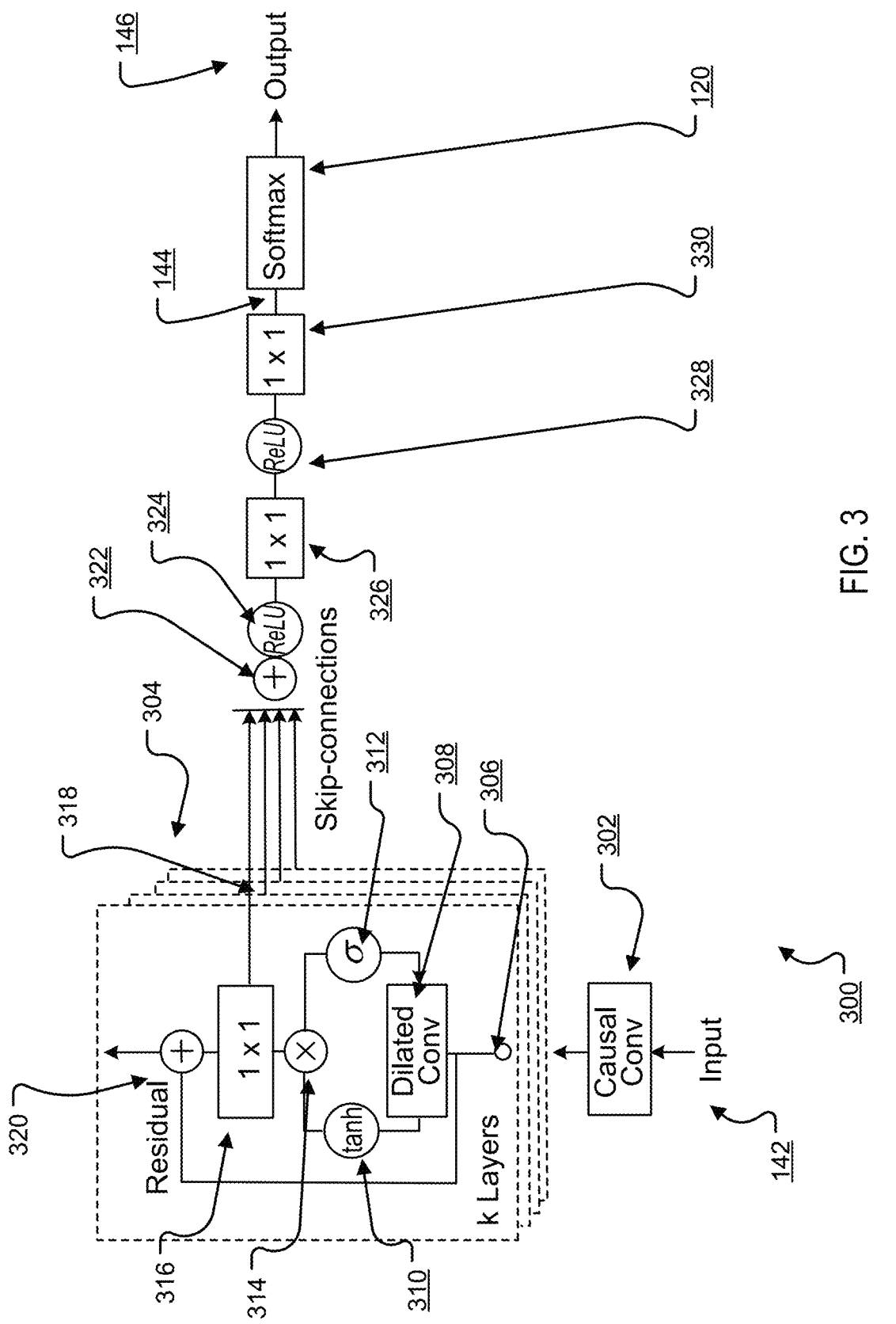
FIG. 3 shows an example architecture for the convolutional subnetwork.

FIG. 3 shows an example architecture 300 for the convolutional subnetwork 110 of FIG. 1. As described above, in the example architecture 300, the dilated causal convolutional layers that are in the convolutional subnetwork have residual connections and skip connections.

In particular, in the architecture 300, the convolutional subnetwork 110 includes a causal convolutional layer 302 that processes the current output sequence 142, i.e., by applying a causal convolution to the current output sequence 142.

The convolutional subnetwork 110 then processes the output of the causal convolutional layer 302 through a stack of dilated causal convolutional layers.

Each dilated causal convolutional layer 304 in the stack applies a dilated causal convolution 308 to the input 306 to the dilated causal convolutional layer 304. As described above, in some implementations, the dilated causal convolutional layers in the stack are arranged in blocks, with the dilation of the dilated causal convolutions applied by each layer increasing within a given block and then restarting at the initial value for the first layer in the next block.

In some implementations, the dilated causal convolutional layers in the stack have a gated activation function in which the output of an element-wise non-linearity, i.e., of a conventional activation function, is element-wise multiplied by a gate vector. In some of these implementations, the dilated causal convolution 308 includes two dilated causal convolutions on the layer input 302—a first dilated causal convolution between a main filter for the layer 304 and the layer input 306 and another dilated causal convolution between a gate filter for the layer 304 and the layer input 306. In others of these implementations, dilated causal convolution 308 is a single dilated causal convolution and half of the output of the single convolution is provided as the output of the dilated causal convolution between the main filter for the layer 304 and the layer input 306 and the other half of the output of the single convolution is provided as the output of the dilated causal convolution between the gate filter for the layer 304 and the layer input 306.

The dilated causal convolutional layer 304 then determines the output of the activation function of the layer 304 using the outputs of the dilated causal convolution.

In particular, when the activation function is a gated activation function and the output sequence being generated is not conditioned on a neural network input, the layer 304 applies an element-wise non-linear function 310 which, in the example of FIG. 3 is the tan h function, to the output of the dilated convolution with the main filter and applies an element-wise gating function which, in the example of FIG. 3, is the sigmoid function, to the output of the dilated convolution with the gate filter. The layer 304 then performs an element-wise multiplication 314 between the output of the non-linear function 310 and the output of the gating function 312 to generate the activation function output.

More specifically, when the element-wise non-linearity is tan h and the element-wise gating function is the sigmoid function, the output of the activation function z for a layer k satisfies:

$$z=\tan h(W_{f,k}*x)\odot\sigma(W_{g,k}*x),$$

where $W_{f,k}$ is the main filter for the layer k, x is the layer input, * denotes a causal dilated convolution, $\odot$ denotes element-wise multiplication, and $W_{g,k}$ is the gate filter for the layer k.

When the output sequence being generated is conditioned on a neural network input, the layer 304 also conditions the output of the activation function on the neural network input. In particular, the non-linear function and the gating function each take as input a combination of the corresponding dilated convolution output and an input generated from the neural network input.

More specifically, when the neural network input includes global features and is therefore the same for all of the time steps in the sequence, the element-wise non-linearity is tan h and the element-wise gating function is the sigmoid function, the output of the activation function z for the layer k satisfies:

$$z=\tan h(W_{f,k}*x+V_{f,k}^T h)\odot\sigma(W_{g,k}*x+V_{g,k}^T h),$$

where $V_{f,k}^T$ is a main learnable linear projection (of h to the main component of the activation function) for the layer k, h is the neural network input, and $V_{f,k}^T$ is a gate learnable linear projection (of h to the gate component of the activation function) for the layer k.

Alternatively, when the neural network input includes local features, i.e., features that change from time step to time step, the system 100 obtains a sequence y that includes a set of features for each time step in the output sequence. The output of the activation function z for the layer k then satisfies:

$$z=\tan h(W_{f,k}*x+V_{f,k}*y)\odot\sigma(W_{g,k}*x+V_{g,k}*y),$$

where $V_{f,k}*y$ and $V_{g,k}*y$ are respective 1×1 convolutions. In some implementations, the system 100 directly receives the sequence y as the neural network input, i.e., directly receives a sequence that has the same resolution as the output sequence. In other implementations, the system 100 receives a sequence having a lower resolution, i.e., with a lower sampling frequency, than the output sequence. In these cases, the system can generate the sequence y by processing the lower resolution sequence using a transposed (learned upsampling) convolutional network to generate the sequence y or can repeat values from the lower resolution sequence across time to generate the sequence y.

As an example, when the local features are linguistic features for use in text to speech generation, the linguistic features can include some or all of phone, syllable, word, phrase, and utterance-level features of the text. Example sets of linguistic features that can be used are described in Zen, Heiga. *An example of context-dependent label format for HMM-based speech synthesis in English*, 2006. URL http://hts.sp.nitech.ac.jp/?Download and Zen, Heiga, Senior, Andrew, and Schuster, Mike. *Statistical parametric speech synthesis using deep neural networks*. In Proc. ICASSP, pp. 7962-7966, 2013.

Because the architecture 300 includes skip connections and residual connections for the dilated causal convolutional layers, the layer 304 then performs a 1×1 convolution 316 on the activation function output.

The layer 304 provides the output of the 1×1 convolution as the skip output 318 of the layer and adds the residual, i.e., the layer input 306, and the output of the 1×1 convolution to generate the final output 320 of the layer 304. The convolutional subnetwork 110 then provides the final output 320 as the layer input to the next dilated convolutional layer in the stack.

In some implementations, the layer 304 performs two 1×1 convolutions on the activation function output, one with a residual filter and the other with a skip filter. In these implementations, the layer 304 provides the output of the convolution with the skip filter as the skip output 318 of the layer and adds the residual and the output of the 1×1 convolution with the residual filter to generate the final output 320 of the layer 304.

The convolutional subnetwork 110 then provides the final output 320 as the layer input to the next dilated convolutional layer in the stack. For the last layer in the stack, because there is no next layer, the convolutional subnetwork 110 can either discard the final output 320 generated by the last layer or can refrain from computing a final output, i.e., can refrain from performing the 1×1 convolution and the residual sum for the last layer in the stack.

Once the processing of all of the layers 304 in the stack of dilated convolutional layers has been completed, the convolutional subnetwork 110 sums 322 the skip outputs generated by the layers 304. The convolutional subnetwork 110 can then apply one or more non-linear functions, one or more 1×1 convolutions, or both to the sum 322 to generate the alternative representation 144. In particular, in the example of FIG. 3, the convolutional subnetwork 110 applies an element-wise non-linearity 324, e.g., a ReLU, followed by a 1×1 convolution 326, followed by another element-wise non-linearity 328, and followed by a final 1×1 convolution 330, to generate the alternative representation 144.

As described above, the output layer 120 then processes the alternative representation 144 to generate the score distribution 146.

Figure 4:
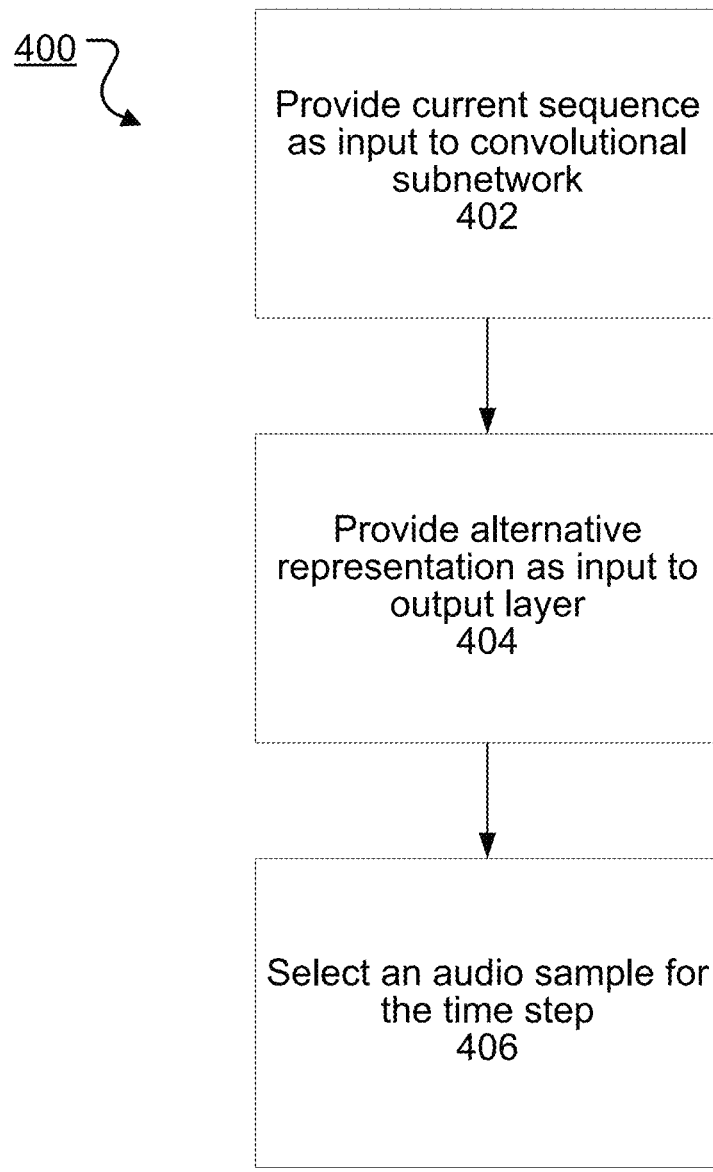
FIG. 4 is a flow diagram of an example process for generating an audio sample at a given time step in an audio sequence.

FIG. 4 is a flow diagram of an example process 400 for generating an audio sample at a given time step in an audio sequence. For convenience, the process 400 will be described as being performed by a system of one or more computers located in one or more locations. For example, a neural network system, e.g., the neural network system 100 of FIG. 1, appropriately programmed, can perform the process 400.

The system provides a current audio sequence as input to the convolutional subnetwork (step 402). The current audio sequence is the audio sequence that has already been generated as of the given time step, i.e., a sequence that includes the output audio samples at time steps before the given time step. As described above, the convolutional subnetwork includes audio-processing convolutional neural network layers, e.g., dilated causal convolutional layers, and is configured to process the current sequence of audio data to generate an alternative representation for the given time step.

The system provides the alternative representation as input to an output layer, e.g., a softmax output layer (step 404). The output layer is configured to process the alternative representation to generate a score distribution over possible audio samples for the time step.

The system selects an audio sample for inclusion in the audio sequence at the given time step in accordance with the score distribution (step 406). For example, the system can sample a possible audio sample in accordance with the score distribution.

The system may be trained on raw or compressed and/or companded audio data, for example waveforms of human speakers, music and so forth. Optionally conditioning data may be included, for example text-to-speech data, which may be represented as linguistic features derived from text paired with audio data for a verbalization of the text. At training time, i.e., during the training of the convolutional subnetwork and the output layer to determine trained values of the filters of the convolutional layers and any other parameters of the system, the system can generate the conditional predictions for all time steps in parallel, i.e., instead of autoregressively, because all time steps of the ground truth output that should be generated by the system are known. Generally, the system can perform the training to determine the trained values of the parameters using conventional supervised learning techniques, e.g., a stochastic gradient descent with backpropagation based technique. As described above, because of this parallelization and the use of causal convolutional layers, the system does not need as many computational resources to train as other systems, e.g., those that include recurrent neural network layers, resulting in a reduced training time.

Additionally, because the system generates output sequences auto-regressively, in some implementations, the convolutional subnetwork reuses values computed for previous time steps when computing the alternative representation for the given time step. In particular, because the same audio samples are provided as input to the subnetwork more than once, some of the computation performed by the convolutional subnetwork will be the same at multiple different time steps. In these implementations, rather than re-compute these computations each time step, the convolutional subnetwork can store the output values of the computation the first time that the computation is performed and then re-use the stored output values at subsequent time steps. As a simple example, the first convolutional layer in the convolutional subnetwork will apply the same filter or filters multiple times to the same audio sample values during the generation of an audio sequence. Rather than re-compute the output of these filter applications at each time step, the system can re-use outputs computed at previous time steps.

In some implementations, as another way to increase the receptive field, one stack of dilated causal convolutional layers with a very large (long) receptive field, but preferably fewer units per layer, may be employed to condition another (larger) stack with a smaller receptive field. The larger stack may process a shorter part of the audio signal, for example cropped at the end.

The above description describes a system that generates a sequence of audio data. The description below with reference to FIGS. 5-12 describes systems that perform sequence processing or transduction tasks, i.e., generate an output sequence from an input sequence.

The systems described below can be configured to perform any of a variety of sequence processing or sequence transduction tasks.

For example, the systems can be configured to perform a speech recognition task, where the input sequence is a sequence of audio data, e.g., raw audio data, and the system generates a sequence of phonemes that is a phoneme representation of the input sequence or a sequence of graphemes that is a grapheme representation of the input sequence.

As another example, the systems can be configured to perform a language modelling task, where the input sequence is a sequence of phonemes or graphemes and the output sequence generated by the system is a sequence of words in a first natural language that represents the input sequence.

As another example, the systems can be configured to perform a machine translation task, where the input sequence is a sequence of words in a first natural language and the output sequence generated by the system is a sequence of words in a second natural language that is a translation of the input sequence into the second natural language.

As another example, the systems can be configured to perform a natural language processing task, e.g., sentence summarization, sentence parsing, part of speech tagging, and so on, where the input sequence is a sequence of words in a first natural language and the output sequence generated by the system is a sequence that classifies the words in the input sequence according to the kind of output required by the natural language processing task.

As another example, the systems can be configured to perform a compression task, where the input sequence is a sequence of data drawn from an input sample, e.g., audio data or image data, and the output sequence is a compressed or encoded sample.

As another example, the systems can be configured to perform a medical analysis task, where the input sequence is a sequence of health data for a particular patient, and the output sequence includes data that characterizes the health of the patient or predicts the future health of the patient.

In particular, while the description of the system with reference to FIGS. 9-12 focuses on the task of machine translation, the system can instead be configured to perform another sequence or processing or sequence transduction task, i.e., can instead generate a different kind of output sequence from a different kind of input sequence.

Figure 5:
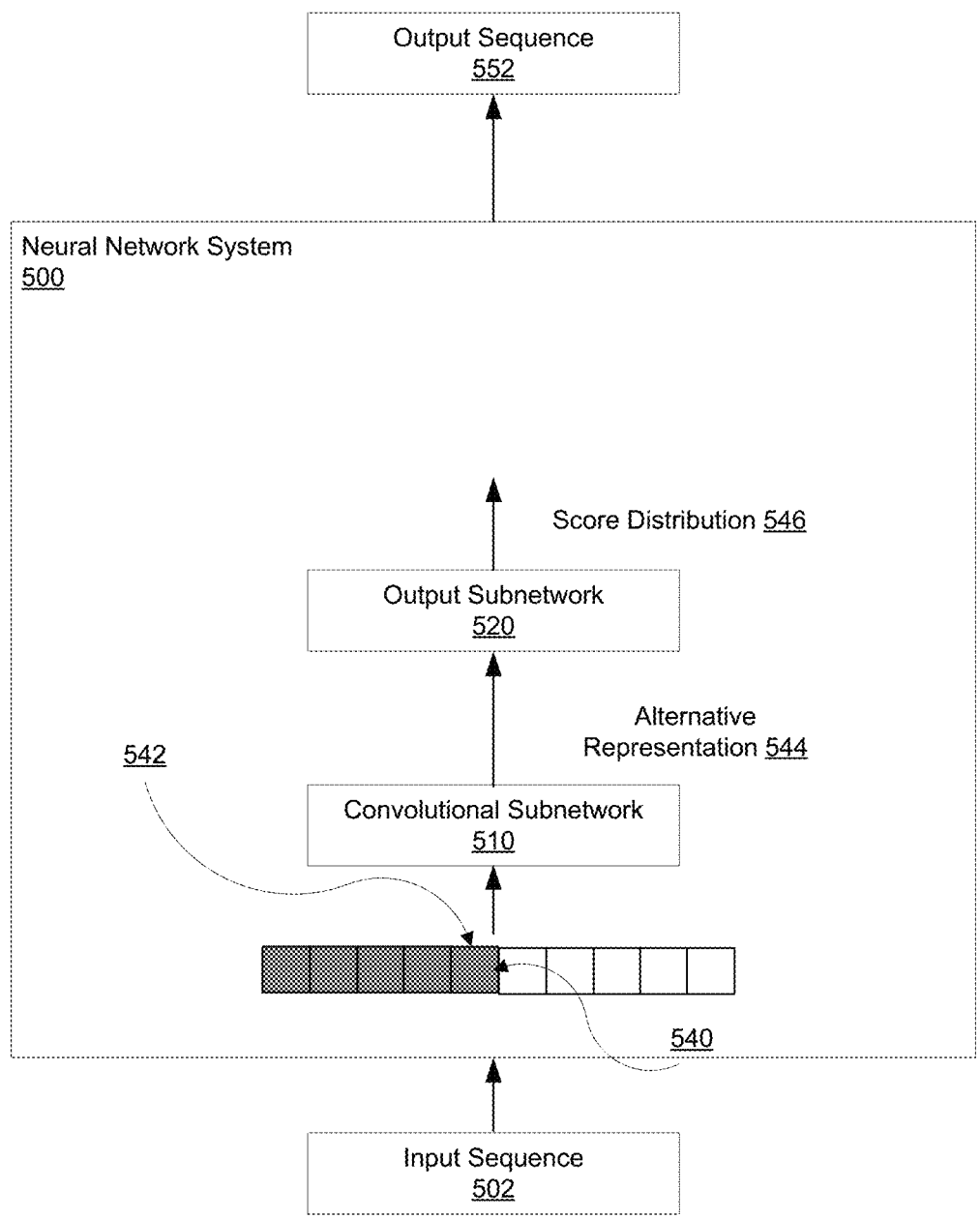
FIG. 5 shows an example neural network system.

FIG. 5 shows an example neural network system 500. The neural network system 500 is an example of a system implemented as computer programs on one or more computers in one or more locations, in which the systems, components, and techniques described below can be implemented.

The neural network system 500 is a system that performs a sequence processing task, i.e., generates an output sequence 552 from an input sequence 502. The system 500 can be configured to perform any of a variety of sequence processing tasks.

More specifically, the input sequence 502 includes a respective input at each of multiple input time steps and the neural network system 500 generates the output sequence 552 by processing a current input sequence at some or all of the time steps. The current input sequence at a given time step includes the input at the given time step and the inputs that precede the input in the input sequence. For example, for time step 540 in input sequence 502, the current input sequence 542 includes the input at time step 540 and the inputs at time steps before time step 540 in the input sequence 502.

In some implementations, the neural network system 500 processes a respective current input sequence for each time step in the input sequence. In some other implementations, the neural network system 500 does not process current input sequences for one or more initial inputs in the input sequence, i.e., the system 500 waits until a specified number of inputs have been seen before beginning processing.

The neural network system 500 includes a convolutional subnetwork 510 and an output subnetwork 520.

At a given time step during the generation of an output sequence, the convolutional subnetwork 510 is configured to receive the current input sequence, i.e., the sequence that includes the inputs at and before the given time step, and to process the current input sequence to generate an alternative representation for the time step. For example, for the time step 540 in the input sequence 502, the convolutional subnetwork 510 can receive the current input sequence 542 and process the current input sequence 542 to generate an alternative representation 544.

The output subnetwork 520 is configured to receive the alternative representations for each of the time steps and to generate, from the alternative representations, a respective score distribution over possible outputs for each position in the output sequence. For example, the output subnetwork can generate a score distribution 546 for a particular position in the output sequence 552. Each score distribution includes a respective score for each of multiple possible outputs and the score distributions generated by the output subnetwork 520 during generation of the output sequence 552 are collectively referred to as the neural network output for the input sequence 502.

In particular, when the neural network system 500 is configured to generate a sequence of phonemes, each score distribution includes a respective score for each phoneme in a vocabulary of phonemes. When the neural network system 500 is configured to generate a sequence of graphemes, the score distribution includes a respective score for each grapheme in a vocabulary of graphemes. When the neural network system 500 is configured to generate a sequence of words, the score distribution includes a respective score for each word in a vocabulary of words. In some implementations, the corresponding vocabulary, i.e., the vocabulary of graphemes, phonemes, or words, includes one or more special outputs, e.g., a blank output that indicates that the next output in the output sequence is not yet ready to be generated.

Once the output subnetwork 546 has generated a score distribution for a given position in the output sequence, the neural network system 500 can select an output to be included in the output sequence at the position from the multiple possible outputs in accordance with the score distribution. For example, the neural network system 500 can select an output by sampling from the score distribution, i.e., sampling from the possible outputs in accordance with the scores in the score distribution, or can select the possible outputs having the highest score according to the score distribution.

The convolutional subnetwork 510 generally includes multiple convolutional neural network layers. More specifically, the convolutional neural network layers include multiple causal convolutional layers.

A causal convolutional layer is a convolutional layer that operates on an input sequence that has a respective input at each of multiple time steps by, for each time step, generating an output that depends only on the inputs at the time step and at the time steps before the time step in the input sequence, i.e., and not on any inputs at any time steps after the time step in the input sequence. In some cases, the causal convolutional layers are implemented by applying a normal convolution and then shifting each output of the normal convolution by a few time steps, i.e., shifting each output forward by (filter length−1) time steps, prior to applying the activation function for the convolutional layer, where "filter length" is the length of the filter of the convolution that is being applied.

To increase the receptive field of the causal convolutional layers without requiring an excessive number of layers or filters of excessive length, some or all of the convolutional layers can be dilated causal convolutional layers. A dilated convolution is a convolution where the filter is applied over an area larger than its length by skipping input values with a certain step that is defined by the dilation value for the dilated convolution. By incorporating dilated causal convolutions, the convolutional neural network layers effectively operate on their inputs with a coarser scale than with a normal convolution.

In some implementations, the convolutional neural network layers include a stack of multiple blocks of dilated causal convolutional layers. Each block in the stack can include multiple dilated convolutional neural network layers with increasing dilation. For example, within a block, the dilation can double for each layer starting from an initial dilation, and then return to the initial dilation for the first layer in the next block. As an illustrative example, the dilations of the dilated convolutional layers in a block can be, in order: 1, 2, 4, . . . , 512. A simplified example of a block of dilated causal convolutional layers is described below with reference to FIG. 2.

In some implementations, the convolutional subnetwork includes residual connections, skip connections, or both. An example architecture of the convolutional subnetwork that includes both residual connections and skip connections is described below with reference to FIG. 3.

Generally, the output subnetwork 520 can be any neural network-based subnetwork that is appropriate for generating the kind of neural network output that the system 500 is configured to generate using the alternative representations generated by the convolutional subnetwork 510, e.g., a recurrent neural network-based subnetwork, a fully-connected subnetwork, a single output layer, and so on.

In some particular implementations, e.g., in implementations where the system 500 is configured to perform speech recognition, the output subnetwork 520 includes a mean pooling layer that is configured to receive a subset of the alternative representations, i.e., the alternative representations for a specified number of time steps in the input sequence, and perform mean pooling on the alternative representations to generate a mean pooled representation for the alternative representation that aggregates the alternative representations to a coarser frame. In these implementations, the output subnetwork 520 also includes one or more additional layers, e.g., one or more non-causal convolutional layers followed by a softmax output layer, configured to receive the mean pooled representation and to generate a score distribution for an output in the output sequence at a position corresponding to the coarser frame. That is, each output position in the output sequence corresponds to a different subset of the alternative representations generated by the convolutional subnetwork 510.

Figure 6:
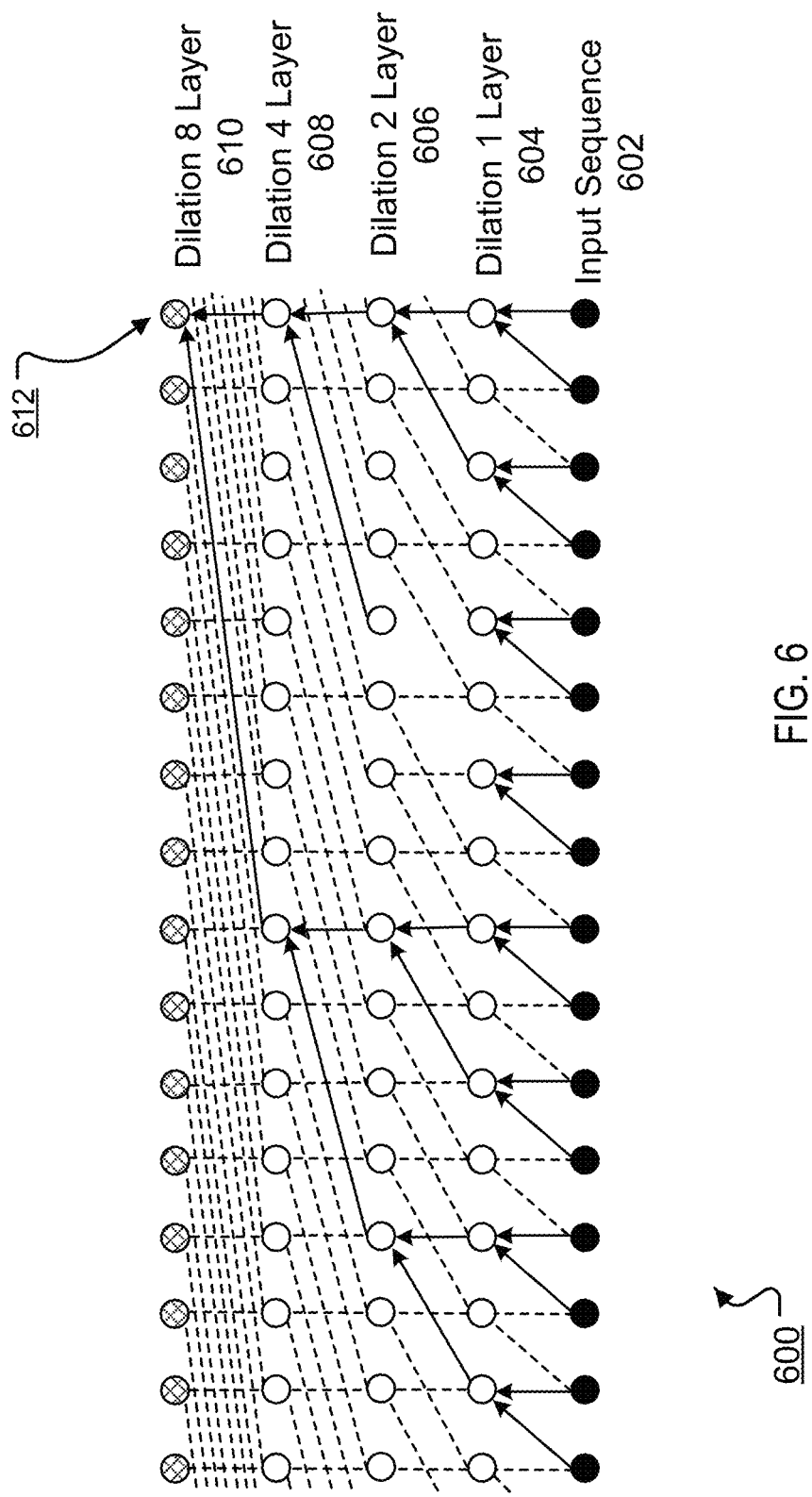
FIG. 6 shows a visualization of an example block of dilated causal convolutional layers.

FIG. 6 shows a visualization 600 of an example block of dilated causal convolutional layers. In particular, the example block includes a dilated causal convolutional layer 604 with dilation one, a dilated causal convolutional layer 606 with dilation two, a dilated causal convolutional layer 608 with dilation four, and a dilated causal convolutional layer 610 with dilation eight.

In the visualization 600, the block of dilated causal convolutional layers are operating on a current input sequence 602 to generate an output sequence. In particular, the visualization 600 visualizes using bold arrows how the block generates the output 612 that is the output at the time step that is currently the last time step in the current input sequence 602 and the output sequence.

As can be seen from the visualization 600, because each layer in the block is a causal convolutional layer, the output 612 depends only on outputs that are at the last current time step or time steps before the last current time step in the various sequences operated on by the layers in the block.

Additionally, as can be seen from the visualization 600, the layers in the block are arranged in order of increasing dilation, with the first layer in the block, i.e., dilated causal convolutional layer 604, having dilation one and the last layer in the block, i.e., dilated causal convolutional layer 604, having dilation eight. In particular, as is shown by the bold arrows in the visualization 600, because the dilated causal convolutional layer 604 has dilation one, the filter of the layer 604 is applied to adjacent inputs in the current input sequence 602. Because the dilated causal convolutional layer 606 has dilation two, the filter of the layer 606 is applied to outputs that are separated by one output in the output sequence generated by the layer 604. Because the dilated causal convolutional layer 608 has dilation four, the filter of the layer 608 is applied to outputs that are separated by three outputs in the output sequence generated by the layer 606. Because the dilated causal convolutional layer 610 has dilation eight, the filter of the layer 610 is applied to outputs that are separated by seven outputs in the output sequence generated by the layer 608.

Figure 7:
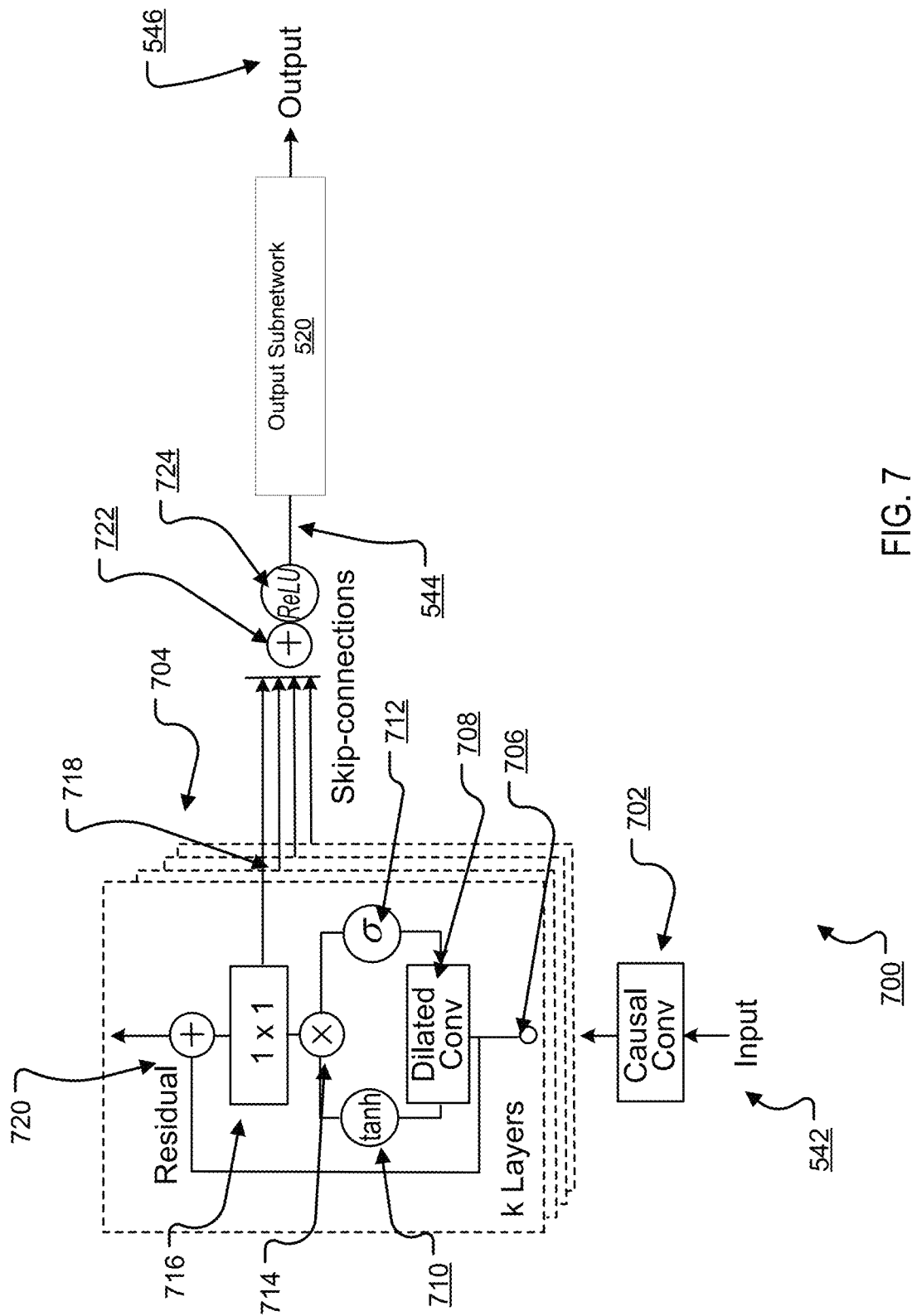
FIG. 7 shows an example architecture for the convolutional subnetwork.

FIG. 7 shows an example architecture 700 for the convolutional subnetwork 510 of FIG. 1. As described above, in the example architecture 700, the dilated causal convolutional layers that are in the convolutional subnetwork have residual connections and skip connections.

In particular, in the architecture 700, the convolutional subnetwork 110 includes a causal convolutional layer 702 that processes the current input sequence 142.

The convolutional subnetwork 110 then processes the output of the causal convolutional layer 702 through a stack of dilated causal convolutional layers.

Each dilated causal convolutional layer 704 in the stack applies a dilated causal convolution 708 to the input 706 to the dilated causal convolutional layer 704. As described above, in some implementations, the dilated causal convolutional layers in the stack are arranged in blocks, with the dilation of the dilated causal convolutions applied by each layer increasing within a given block and then restarting at the initial value for the first layer in the next block.

In some implementations, the dilated causal convolutional layers in the stack have a gated activation unit in which the output of an element-wise non-linearity, i.e., of a conventional activation function, is element-wise multiplied by a gate vector. In some of these implementations, the dilated causal convolution 708 includes two dilated causal convolutions on the layer input 702—a first dilated causal convolution between a main filter for the layer 704 and the layer input 706 and another dilated causal convolution between a gate filter for the layer 704 and the layer input 706. In others of these implementations, dilated causal convolution 708 is a single dilated causal convolution and half of the output of the single convolution is provided as the output of the dilated causal convolution between the main filter for the layer 704 and the layer input 706 and the other half of the output of the single convolution is provided as the output of the dilated causal convolution between the gate filter for the layer 704 and the layer input 706.

The dilated causal convolutional layer 704 then determines the output of the activation unit of the layer 704 using the outputs of the dilated causal convolution.

In particular, when the activation function is a gated activation unit, the layer 704 applies an element-wise non-linear function 710 which, in the example of FIG. 7 is the tan h function, to the output of the dilated convolution with the main filter and applies an element-wise gating function which, in the example of FIG. 7, is the sigmoid function, to the output of the dilated convolution with the gate filter. The layer 704 then performs an element-wise multiplication 714 between the output of the non-linear function 710 and the output of the gating function 712 to generate the activation unit output.

More specifically, when the element-wise non-linearity is tan h and the element-wise gating function is the sigmoid function, the output of the activation unit z for a layer k satisfies:

$$z = \tan h(W_{f,k} * x) \odot \sigma(W_{g,k} * x),$$

where $W_{f,k}$ is the main filter for the layer k, x is the layer input, * denotes a causal dilated convolution, $\odot$ denotes element-wise multiplication, and $W_{g,k}$ is the gate filter for the layer k.

Because the architecture 700 includes skip connections and residual connections for the dilated causal convolutional layers, the layer 704 then performs a 1×1 convolution 716 on the activation unit output.

The layer 704 provides the output of the 1×1 convolution as the skip output 718 of the layer and adds the residual, i.e., the layer input 706, and the output of the 1×1 convolution to generate the final output 720 of the layer 704.

In some implementations, the layer 704 performs two 1×1 convolutions on the activation unit output, one with a residual filter and the other with a skip filter. In these implementations, the layer 704 provides the output of the convolution with the skip filter as the skip output 718 of the layer and adds the residual and the output of the 1×1 convolution with the residual filter to generate the final output 720 of the layer 704.

The convolutional subnetwork 110 then provides the final output 720 as the layer input to the next dilated convolutional layer in the stack. For the last layer in the stack, because there is no next layer, the convolutional subnetwork 110 can either discard the final output 720 generated by the last layer or can refrain from computing a final output, i.e., can refrain from performing the 1×1 convolution and the residual sum for the last layer in the stack.

Once the processing of all of the layers 704 in the stack of dilated convolutional layers has been completed, the convolutional subnetwork 110 sums 722 the skip outputs generated by the layers 704 and, optionally, applies one or more additional operations on the sum to generate the alternative representation 144. In particular, in the example of FIG. 7, the convolutional subnetwork 110 applies an element-wise non-linearity 724, e.g., a ReLU, to generate the alternative representation 144.

As described above, the output subnetwork 120 then processes the alternative representation 144 to generate the score distribution 146. While illustrated in FIG. 7 as generating a score distribution 146 from a single alternative representation, in implementations where the output sequence has fewer positions than there are inputs in the input sequence, the output subnetwork 120 may instead aggregate multiple alternative representations to generate the score distribution 146, e.g., by employing a mean pooling layer as described above.

Figure 8:
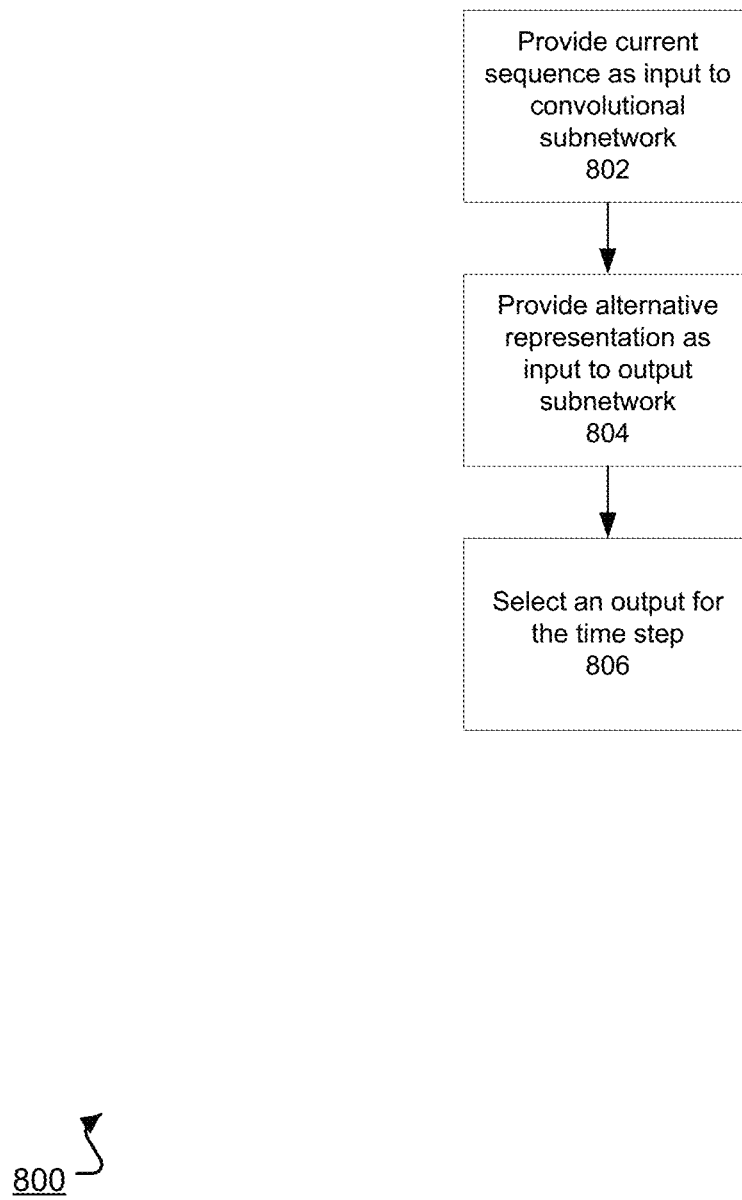
FIG. 8 is a flow diagram of an example process for processing a current input sequence.

FIG. 8 is a flow diagram of an example process 800 for processing a current input sequence. For convenience, the process 800 will be described as being performed by a system of one or more computers located in one or more locations. For example, a neural network system, e.g., the neural network system 500 of FIG. 1, appropriately programmed, can perform the process 800.

The system provides a current input sequence as of a given time step as input to the convolutional subnetwork (step 802). The current input sequence is a sequence that includes the input at the given time step and the inputs at time steps before the given time step in the input sequence. As described above, the convolutional subnetwork includes convolutional neural network layers, e.g., dilated causal convolutional layers, and is configured to process the current sequence to generate an alternative representation for the given time step.

The system provides the alternative representation as input to an output subnetwork (step 804). The output subnetwork is configured to process the alternative representation and, optionally, alternative representations from other time steps to generate a score distribution over possible outputs for a position in the output sequence.

The system selects an output for inclusion in the output sequence in accordance with the score distribution (step 806). For example, the system can sample a possible output in accordance with the score distribution or can select the possible output having the highest score.

The system can be trained on training data that includes source sequence—target sequence pairs. In some implementations, at training time, i.e., during the training of the convolutional subnetwork and the output subnetwork to determine trained values of the filters of the convolutional layers and any other parameters of the system, the system trains the networks with one loss term that measures how well the networks classify the frame. In some other implementations, the system trains the networks with two loss terms, one to predict the next sample and one to classify the frame.

Additionally, because the system processes values from the input sequence in multiple passes, in some implementations, the convolutional subnetwork reuses values computed for previous time steps when computing the alternative representation for the given time step. In particular, because the same inputs are provided as input to the subnetwork more than once, i.e., as part of multiple current input sequences, some of the computation performed by the convolutional subnetwork will be the same at multiple different time steps. In these implementations, rather than re-compute these computations each time step, the convolutional subnetwork can store the output values of the computation the first time that the computation is performed and then re-use the stored output values at subsequent time steps. As a simple example, the first convolutional layer in the convolutional subnetwork will apply the same filter or filters multiple times to the same inputs during the generation of an output sequence. Rather than re-compute the output of these filter applications at each time step, the system can re-use outputs computed at previous time steps.

In some implementations, as another way to increase the receptive field, one stack of dilated causal convolutional layers with a very large (long) receptive field, but preferably fewer units per layer, may be employed to condition another (larger) stack with a smaller receptive field. The larger stack may process a shorter part of the input sequence, for example cropped at the end.

Figure 9:
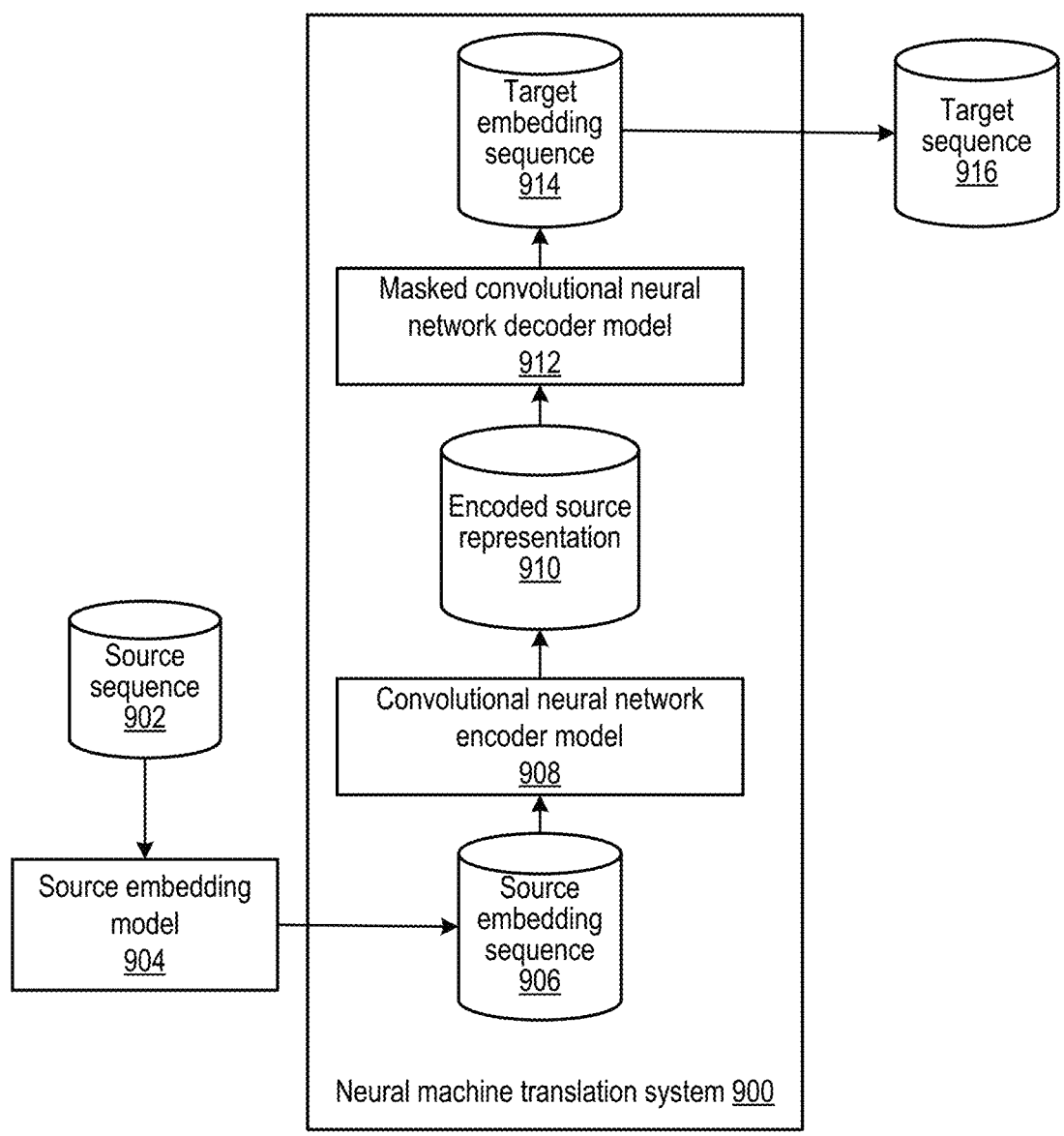
FIG. 9 shows an example neural machine translation system.

FIG. 9 shows an example neural machine translation system 900. The neural machine translation system 900 is an example of a system implemented as computer programs on one or more computers in one or more locations in which the systems, components, and techniques described below are implemented.

The neural machine translation system 900 receives as input a source embedding sequence 906 that is generated by a source embedding model 904 from a source sequence 902 in a source natural language. In some implementations, the source embedding model 904 can be a bag of n-grams embedding model.

The neural machine translation system 900 includes a convolutional neural network encoder 908 that takes as input the source embedding sequence 906 and generates as output an encoded source representation 910.

The encoder 908 has a dilated convolutional architecture and applies one-dimensional convolutions to the source embedding sequence 906. In general, dilated convolutional architectures have the effect of increasing the receptive field size of neurons in a convolutional network, allowing longer range interactions between neurons than would be feasible without dilation. A dilated one-dimensional convolutional layer generates an output by convolving the input with the kernel corresponding to the layer, where the convolution skips inputs according to a step size referred to as the dilation rate. Different dilated convolutional layers within a dilated convolutional network may have different dilation rates. If the dilation rate increases exponentially between layers, then the receptive field size of neurons in the convolutional neural network grows exponentially with the number of layers. In some implementations, the layers of the encoder 908 are assigned to one or more groups, and within each group, the dilation rates of layers in the group are doubled every layer, starting from a dilation rate of 1.

In particular, the encoder 908 generates an encoded source representation 910 that has the same length as the source embedding sequence 906, and thereby preserves the resolution of the source embedding sequence.

The neural machine translation system 900 includes a masked convolutional neural network decoder 912 that takes as input the encoded source representation 910 and generates as output the target embedding sequence 914, which is a representation of the target sequence 916. The target sequence 916 is a sequence of words that is a translation of the source sequence 902 into a target natural language.

Similar to the encoder 108, the decoder 912 has a dilated one-dimensional convolutional architecture. In general, the masked convolutional architecture of the decoder 912 ensures that the decoder does not rely on target embeddings generated at future time steps in order to generate a target embedding at a given time step. In some implementations, the layers of the decoder 912 are assigned to one or more groups, and within each group, the dilation rates of layers in the group are doubled every layer, starting from a dilation rate of 1.

The decoder 912 generates variable length target embedding sequences 914 by dynamic unfolding, where the decoder iteratively generates target embeddings based on previously generated target embeddings and the encoded source representation, until the decoder generates an end-of-sequence (EOS) token.

In addition to the dilated masked convolutional layers, the decoder 912 may also contain sub-batch normalization layers. That is, in these implementations, one or more of the one-dimensional masked convolutional layers of the decoder are followed by a sub-batch normalization layer.

The operation of sub-batch normalization layers is described below with reference to process 1200 of FIG. 12.

An example process for generating a target sequence from a source sequence using the encoder and decoder neural networks is described in more detail below with reference to FIG. 10.

Figure 10:
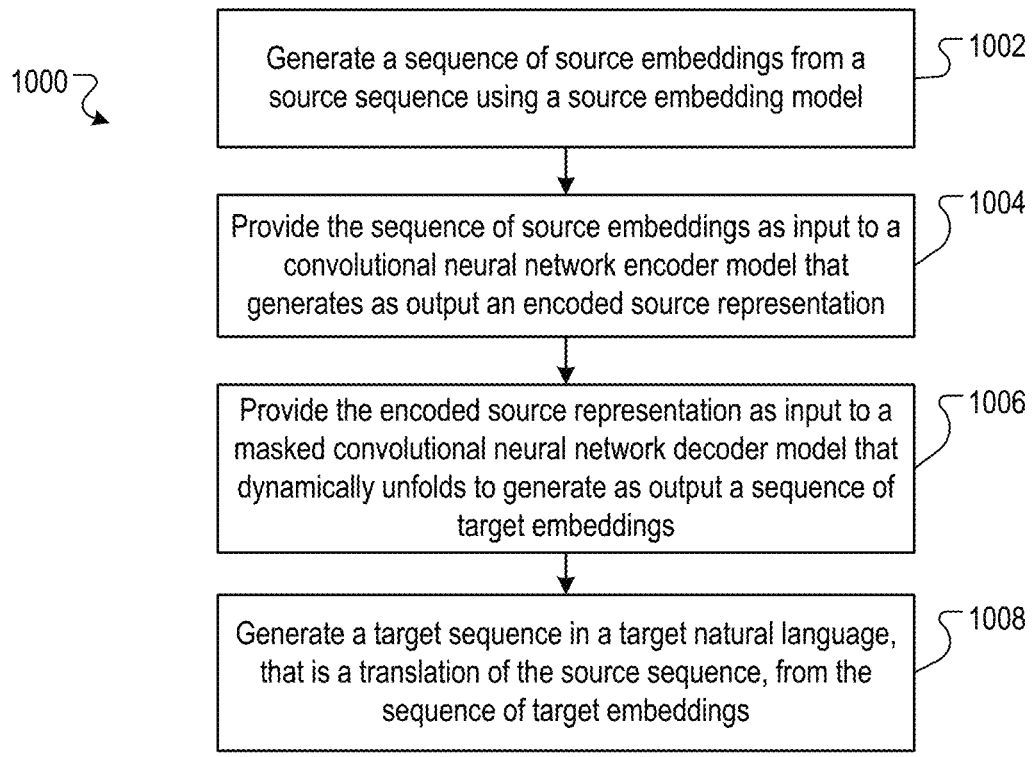
FIG. 10 is a flow diagram of an example process for generating a target sequence from a source sequence.

FIG. 10 is a flow diagram of an example process 1000 for generating a target sequence from a source sequence. For convenience, the process 1000 will be described as being performed by a system of one or more computers located in one or more locations. For example, a neural machine translation system, e.g., the neural machine translation system 900 of FIG. 9, appropriately programmed in accordance with this specification, can perform the process 1000.

The system generates a sequence of source embeddings from a source sequence of text in a source natural language using a source embedding model (step 1002). In particular, the system sequentially maps characters in the source natural language to corresponding source embedding vectors.

In some implementations, the source embedding model maps a character in the source natural language to a corresponding source embedding vector based only on the character itself. In some other implementations, the source embedding model maps words in the source sequence to corresponding source embedding vectors. In some other implementations, the source embedding model is a bag of n-grams embedding model and maps a character in the source natural language to a corresponding source embedding vector based on n-grams of characters adjacent to the given character, for n ranging from one to k, where k is a predetermined positive integer that is greater than or equal to two. For example, the source embedding model may first associate each n-gram of characters adjacent to the given character to respective n-gram embedding vectors, and generate the source embedding vector by adding the respective n-gram embedding vectors. As another example, the source embedding model may first associate each n-gram of characters adjacent to the given character to respective n-gram embedding vectors, and generate the source embedding vector by concatenating the respective n-gram embedding vectors.

Next, the system provides the sequence of source embeddings as input to a convolutional neural network encoder that generates as output an encoded source representation (step 1004). In general, the encoder is configured to generate an encoded source representation with the same length as the source embedding sequence. Therefore, the encoded source representation does not have a fixed length, because the length of the encoded source representation is determined by the length of the source embedding sequence, which varies between source sequences. In general, the encoder is configured to generate an encoded source representation that is a matrix that includes a respective column of data for each source embedding in the sequence of source embeddings.

In particular, the convolutional neural network encoder includes a stack of dilated convolutional neural network layers and generates the encoded source representation by processing the sequence of source embeddings through the stack of dilated convolutional neural network layers. As described above, in some implementations, the layers of the encoder are assigned to one or more groups, and within each group, the dilation rates of layers in the group are doubled every layer, starting from a dilation rate of 1. In some implementations where the source embedding model associates each n-gram of characters adjacent to the given character in the source sequence to respective n-gram embedding vectors and generates the source embedding vector by concatenating the respective n-gram embedding vectors, the first layer of the encoder is a 1×1 convolutional layer.

Next, the system provides the encoded source representation as input to a masked convolutional neural network decoder that generates as output a sequence of target embeddings (step 1006).

The decoder generates the output sequence of target embeddings using dynamic unfolding. An example process for generating the output sequence of target embeddings using dynamic unfolding is described below with reference to process 300 of FIG. 3.

Next, the system processes the sequence of target embeddings to generate a target sequence in the target natural language that is a translation of the source sequence in the source natural language (step 1008). In general, the system generates the target sequence in the target natural language by sequentially mapping target embeddings to characters or words in the target natural language.

Figure 11:
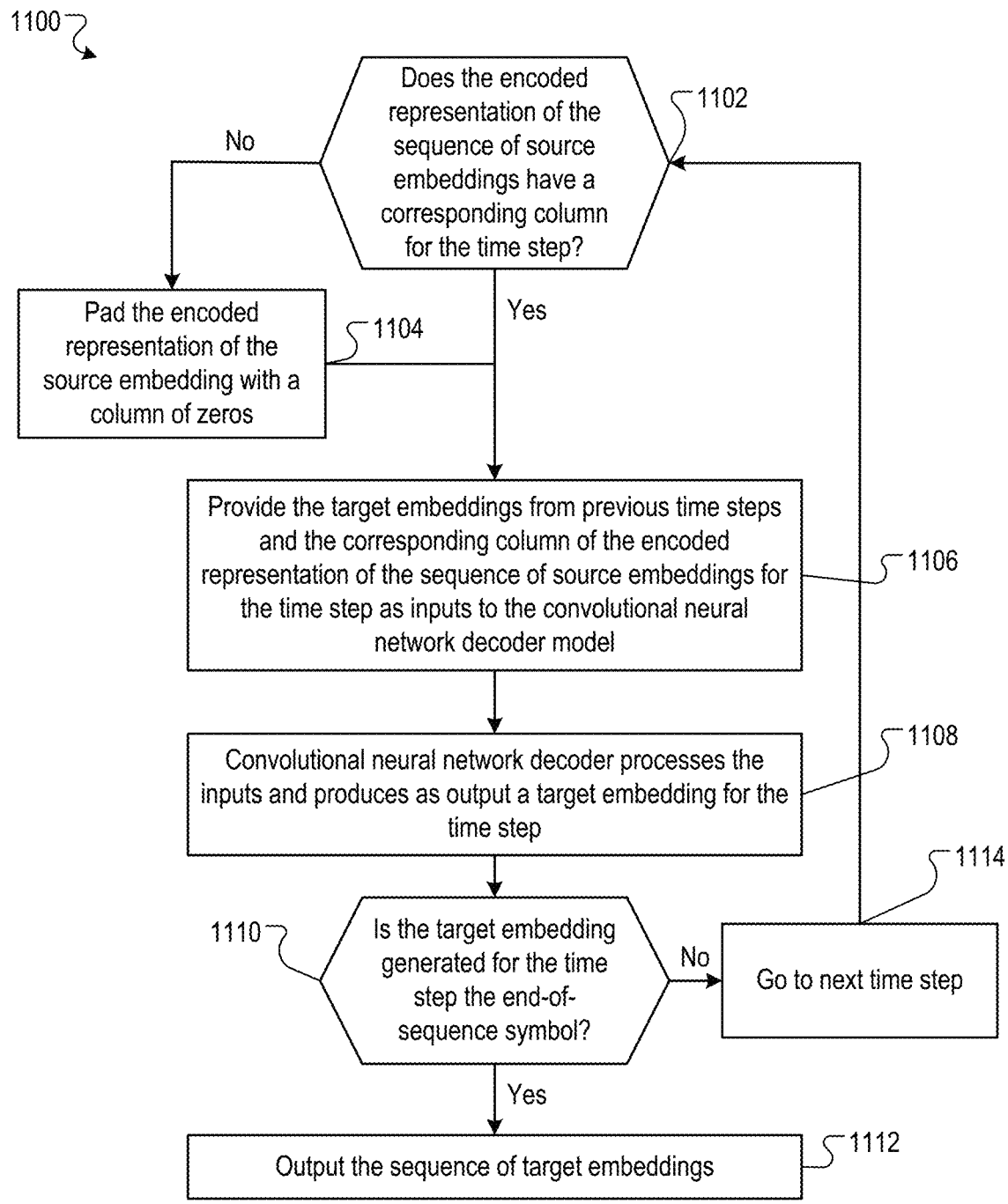
FIG. 11 is a flow diagram of an example process for generating a target sequence using a decoder network.

FIG. 11 is a flow diagram of an example process 1100 for generating a target sequence using a decoder network. For convenience, the process 1100 will be described as being performed by a system of one or more computers located in one or more locations. For example, a neural machine translation system, e.g., the neural machine translation system 900 of FIG. 9, appropriately programmed in accordance with this specification, can perform the process 1100.

The process 1100 describes an iterative process performed by the system that sequentially generates a respective target embedding at each iteration. In the following, each iteration is referred to as a time step.

The system determines whether the encoded representation of the sequence of source embeddings has a corresponding column for the time step (step 1102). In response to determining that the encoded representation does not have a corresponding column for the time step, the system identifies a column of zeros as the corresponding column of the encoded representation for the time step (step 1104). The encoded representation might not have a corresponding column for the time step if, for example, the sequence of target embeddings is longer than the sequence of source embeddings. In response to determining that the encoded representation does have a corresponding column for the time step, the system refrains from modifying the encoded representation.

Next, the system concatenates the target embeddings generated at previous time steps and provides the concatenated target embeddings and the corresponding column of the encoded representation of the sequence of source embeddings for the time step as inputs to the masked one-dimensional convolutional neural network decoder for the current time step (step 1106). The decoder is configured to generate as output probabilities for a set of possible target embeddings for the time step. The system samples a target embedding from set of possible target embeddings in accordance with the probabilities or selects the target embedding with the highest probability as the target embedding for the time step. For example, the final layer of the decoder maybe a softmax output layer that generates the probabilities.

In general, to ensure that the decoder does not depend on future target embeddings that have not been generated at a given time step to generate the target embedding for the given time step, the decoder implements masked convolutions. In some implementations, one-dimensional masked convolutions are implemented by zeroing out some of the weights of the convolutional kernels.

For the first time step, when no target embeddings have been generated at previous time steps, the input to the decoder is only the corresponding column of the encoded representation of the source embedding.

The system may provide the target embeddings and the corresponding column of the encoded representation as input to the decoder in any of a variety of ways. For example, the system can concatenate the target embeddings and the corresponding column of the encoded representation. As another example, the system can add the corresponding column to the target embeddings. As yet another example, the decoder can first process the target embeddings using one or more initial neural network layers, e.g., one or more 1×1 convolutional layers, and then add the column to the output of the initial neural network layers.

Next, the system determines whether the target embedding generated by the decoder is the end-of-sequence (EOS) symbol (step 1110). In response to determining that the generated target embedding is the EOS symbol, the sequence of target embeddings is output (step 1112). In response to determining that the generated target embedding is not the EOS symbol, the process 1100 returns to step 1102 and repeats the preceding steps.

The system can run the encoder and the decoder in parallel, where at each time step, the encoder generates the corresponding column of the encoded source representation, and the decoder processes the corresponding column of the source representation and the previously generated target embeddings to generate the target embedding for the time step.

The system can perform the processes 1000 and 1100 for source sequence inputs for which the desired output, i.e., the target sequence that translates the source sequence from a source natural language into a target natural language, is not known. The system can also perform the processes 1000 and 1100 on source sequence inputs in a set of training data, i.e., a set of inputs for which the target sequence that should be generated by the system is known, in order to determine trained values for the parameters of the layers of the encoder and the decoder. The processes 1000 and 1100 are iteratively performed on inputs selected from a set of training data as part of a conventional machine learning training technique to train the layers.

The machine learning training technique to train the layers may be stochastic gradient descent with backpropagation, where the system selects subsets of the training data, referred to as "batches", the system generates predicted target sequences corresponding to the source sequences in the batch, and the system adjusts the values of the parameters of the layers of the encoder and decoder to improve the performance of the system according to a performance measure by backpropagation.

In some implementations, one or more of the one-dimensional masked convolutional layers of the decoder are followed by a sub-batch normalization layer. The operation of sub-batch normalization layers is described with reference to process 400 of FIG. 4, to which we now turn.

Figure 12:
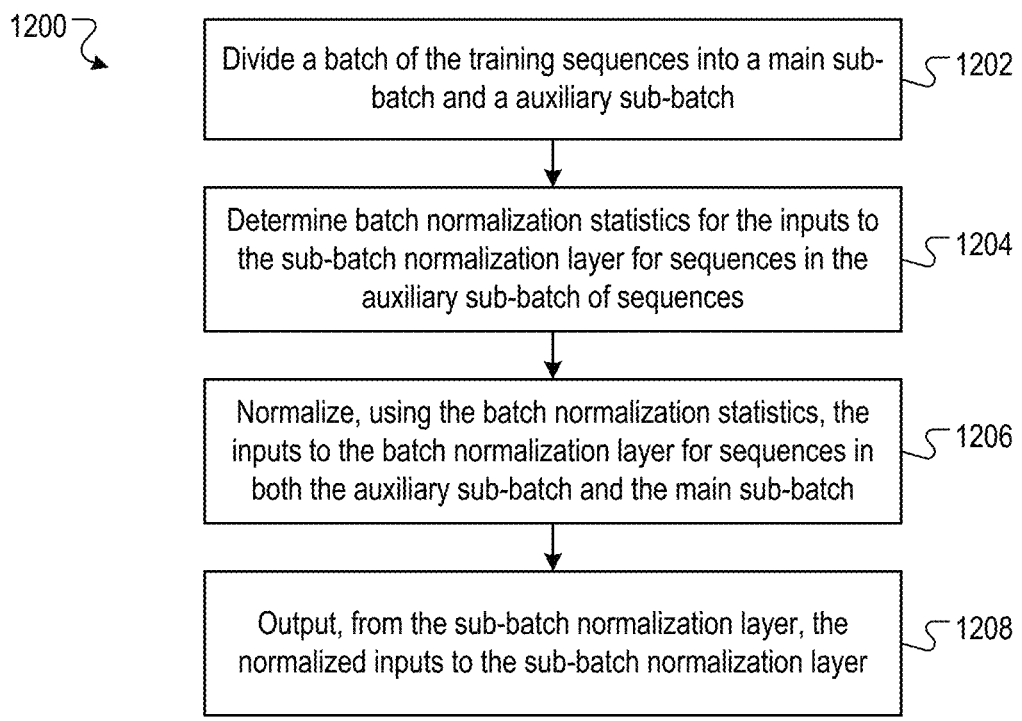
FIG. 12 is a flow diagram of an example process for sub-batch normalization.

FIG. 12 is a flow diagram of an example process 1200 for sub-batch normalization. For convenience, the process 1200 will be described as being performed by a system of one or more computers located in one or more locations. For example, a neural machine translation system, e.g., the neural machine translation system 900 of FIG. 9, appropriately programmed in accordance with this specification, can perform the process 1200.

During a training iteration, for a given batch of source-target sequence pairs, the system divides the batch into a main sub-batch and an auxiliary sub-batch (step 1202). For example, the batch may be randomly or arbitrarily divided into a main sub-batch and an auxiliary sub-batch of respective fixed sizes.

The system determines batch normalization statistics for the inputs to the sub-batch normalization layer for sequences in the auxiliary sub-batch of sequences (step 1204). The batch normalization statistics may include the mean and variance of the inputs to the sub-batch normalization layer.

The system normalizes, using the batch normalization statistics for the auxiliary sub-batch, the inputs to the sub-batch normalization layer for sequences in both the auxiliary sub-batch and the main sub-batch (step 1206).

The system outputs, from the sub-batch normalization layer, the normalized inputs to the sub-batch normalization layer (step 1208), i.e., as input to another layer in the decoder, e.g., a dilated masked convolutional layer.

During training of the system with sub-batch normalization, backpropagation is performed at each iteration based only on the predicted target sequences for the main sub-batch, while the predicted target sequences for the auxiliary sub-batch are ignored in performing backpropagation.

Sub-batch normalization layers differ from conventional batch normalization layers, which do not divide the batch into a main sub-batch and an auxiliary sub-batch, but rather determine the batch normalization statistics based on the whole batch. The calculation of batch normalization statistics takes into account inputs to the batch normalization layer along all the target embeddings in the target embedding sequence, and therefore normalizing the inputs to the batch normalization layer with the batch normalization statistics violates the conditioning structure of the decoder. Using sub-batch normalization layers however, batch normalization statistics are computed based on the auxiliary sub-batch and not the main sub-batch, so the conditioning structure of the decoder is preserved for sequences in the main sub-batch, and backpropagation is performed based on the predicted sequences for the main sub-batch and not the auxiliary sub-batch.

In some implementations, one or more of the layers of the convolutional neural network encoder or decoder are wrapped in a residual block that contains one or more additional convolutional layers. In general, residual blocks enable more effective training of neural networks by adding the input to the residual block to the output of the residual block, allowing the layers inside the residual block to learn incremental representations. In some implementations, the residual block includes a rectified linear unit (ReLU) activation layer. In other implementations, the residual block includes a multiplicative unit activation layer.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A neural network system implemented by one or more computers, wherein the neural network system is configured to generate an output sequence of data elements that comprises a respective data element at each of a plurality of time steps, and wherein the neural network system comprises:
- a convolutional subnetwork comprising one or more data-processing convolutional neural network layers, wherein the data-processing convolutional neural network layers are causal convolutional neural network layers, wherein the convolutional subnetwork is configured to, for each of the plurality of time steps:
  - receive a current sequence of data elements that comprises the respective data element at each time step that precedes the time step in the output sequence, and
  - process the current sequence of data elements to generate an alternative representation for the time step; and
- an output layer, wherein the output layer is configured to, for each of the plurality of time steps:
  - receive the alternative representation for the time step, and
  - process the alternative representation for the time step to generate an output that defines a score distribution over a plurality of possible data elements for the time step.

2. The neural network system of claim 1, wherein the neural network system further comprises:
- a subsystem configured to, for each of the plurality of time steps:
  - select a data element at the time step in the output sequence in accordance with the score distribution for the time step.

3. The neural network system of claim 2, wherein selecting the data element comprises:
sampling from the score distribution.

4. The neural network system of claim 2, wherein selecting the data element comprises:
selecting a data element having a highest score according to the score distribution.

5. The neural network system of claim 1, wherein each of the plurality of time steps corresponds to a respective time in an audio waveform, and wherein the respective data element at each of the plurality of time steps is an audio sample of the audio waveform at the corresponding time.

6. The neural network system of claim 5, wherein the respective at each of the plurality of time steps is (i) a compressed or a companded representation of the audio waveform at the corresponding time, or (ii) an amplitude value of the audio waveform at the corresponding time.

7. The neural network system of claim 1, wherein the data-processing convolutional neural network layers include one or more dilated convolutional neural network layers.

8. The neural network system of claim 7, wherein the data-processing convolutional neural network layers include multiple blocks of dilated convolutional neural network layers, wherein each block comprises multiple dilated convolutional neural network layers with increasing dilation.

9. The neural network system of claim 1, wherein one or more of the data-processing convolutional neural network layers have gated activation units.

10. The neural network system of claim 1, wherein, at each of the plurality of time steps, the alternative representation is conditioned on a neural network input.

11. The neural network system of claim 10, wherein the neural network input comprises features of a text segment, and wherein the output sequence represents a verbalization of the text segment.

12. The neural network system of claim 11, wherein the neural network input further comprises intonation pattern values.

13. The neural network system of claim 10, wherein the neural network input comprises one or more of: speaker identity information, language identity information, and speaking style information.

14. The neural network system of claim 1, wherein the output sequence represents a piece of music.

15. The neural network system of claim 1, wherein the convolutional subnetwork comprises residual connections.

16. The neural network system of claim 1, wherein the convolutional subnetwork comprises skip connections.

17. The neural network system of claim 1, wherein processing the current sequence of data elements to generate an alternative representation for the time step comprises reusing values computed for previous time steps.

18. One or more non-transitory computer storage media encoded with instructions that when executed by one or more computers cause the one or more computers to implement a neural network system,
wherein the neural network system is configured to generate an output sequence of data elements that comprises a respective data element at each of a plurality of time steps, and
wherein the neural network system comprises:
- a convolutional subnetwork comprising one or more data-processing convolutional neural network layers, wherein the data-processing convolutional neural network layers are causal convolutional neural network layers, wherein the convolutional subnetwork is configured to, for each of the plurality of time steps:
  - receive a current sequence of data elements that comprises the respective data element at each time step that precedes the time step in the output sequence, and
  - process the current sequence of data elements to generate an alternative representation for the time step; and
- an output layer, wherein the output layer is configured to, for each of the plurality of time steps:
  - receive the alternative representation for the time step, and
  - process the alternative representation for the time step to generate an output that defines a score distribution over a plurality of possible data elements for the time step.

19. A method of generating an output sequence of data elements that comprises a respective data element at each of a plurality of time steps,
wherein the method comprises, for each of the plurality of time steps:
- providing a current sequence of data elements as input to a convolutional subnetwork comprising one or more data-processing convolutional neural network layers,
  wherein the data-processing convolutional neural network layers are causal convolutional neural network layers,
  wherein the current sequence comprises the respective data element at each time step that precedes the time step in the output sequence, and wherein the convolutional subnetwork is configured to, for each of the plurality of time steps:
receive the current sequence of data elements, and
process the current sequence of data elements to generate an alternative representation for the time step; and
providing the alternative representation for the time step as input to an output layer, wherein the output layer is configured to, for each of the plurality of time steps:
receive the alternative representation for the time step, and
process the alternative representation for the time step to generate an output that defines a score distribution over a plurality of possible data elements for the time step.

20. The method of claim 19, further comprising, for each of the plurality of time steps:
selecting a data element at the time step in the output sequence in accordance with the score distribution for the time step.

\* \* \* \* \*